United States Patent
Bandopadhyay et al.

(10) Patent No.: US 10,909,097 B2
(45) Date of Patent: Feb. 2, 2021

(54) METHOD AND SYSTEM FOR DEPENDENCY ANALYSIS OF WORKLOADS FOR ORCHESTRATION

(71) Applicant: Veritas Technologies LLC, Mountain View, CA (US)

(72) Inventors: Tushar Bandopadhyay, San Jose, CA (US); Bharat Dighe, Cupertino, CA (US)

(73) Assignee: Veritas Technologies LLC, Santa Clara, CA (US)

(*) Notice: Subject to any disclaimer, the term of this patent is extended or adjusted under 35 U.S.C. 154(b) by 345 days.

(21) Appl. No.: 15/844,359

(22) Filed: Dec. 15, 2017

(65) Prior Publication Data
US 2018/0225311 A1 Aug. 9, 2018

Related U.S. Application Data

(60) Provisional application No. 62/454,871, filed on Feb. 5, 2017.

(51) Int. Cl.
*G06F 7/02* (2006.01)
*G06F 16/00* (2019.01)
(Continued)

(52) U.S. Cl.
CPC ........ *G06F 16/215* (2019.01); *G06F 11/1484* (2013.01); *G06F 11/2023* (2013.01);
(Continued)

(58) Field of Classification Search
CPC ............... G06F 16/9024; G06F 16/215; G06F 11/2023; G06F 16/2379; G06F 11/2094;
(Continued)

(56) References Cited

U.S. PATENT DOCUMENTS 7,386,752 B1* 6/2008 Rakic .................. G06F 11/1469
714/2
7,987,368 B2 7/2011 Zhu et al.
(Continued)

OTHER PUBLICATIONS

Alferes, Jose Julio et al., "Evolution and Reactivity in the Semantic Web," F. Bry and J. Maluszynski (eds.): Semantic Techniques for the Web; Lecture Notes in Computer Science—5500; Sep. 29, 2009; pp. 161-200.
(Continued)

*Primary Examiner* — Bruce M Moser
(74) *Attorney, Agent, or Firm* — Campbell Stephenson LLP

(57) ABSTRACT

Methods, computer program products, computer systems, and the like providing for representation and analysis of entities and their relationships are disclosed. The method, for example, includes selecting a node of a plurality of nodes in a property graph, analyzing entity information associated with the node, and, in response to the analyzing, storing the entity information in dependency information. Each node of the plurality of nodes represents an entity of a plurality of entities, and is coupled to at least one other node of the plurality of nodes by one or more links of a plurality of links of the property graph. Each of the one or more links represents a relationship between the each node and the at least one other node. The entity information is information regarding the entity. The dependency information is configured to facilitate orchestration of one or more of the plurality of entities.

8 Claims, 18 Drawing Sheets

(51) Int. Cl.
*G06F 16/215* (2019.01)
*G06F 16/23* (2019.01)
*G06F 16/901* (2019.01)
*G06F 11/14* (2006.01)
*G06F 11/20* (2006.01)

(52) U.S. Cl.
CPC ...... *G06F 11/2094* (2013.01); *G06F 16/2379* (2019.01); *G06F 16/9024* (2019.01); *G06F 11/1446* (2013.01); *G06F 11/2048* (2013.01); *G06F 2201/815* (2013.01)

(58) Field of Classification Search
CPC .. G06F 11/1484; G06F 11/079; G06F 21/577; G06F 11/2048; G06F 11/1446; G06F 2201/815; G06F 11/1469; G06F 11/1482
See application file for complete search history.

(56) References Cited

U.S. PATENT DOCUMENTS

| | | | |
|---|---|---|---|
| 9,087,088 B1* | 7/2015 | Bose | G06Q 30/0276 |
| 9,509,697 B1 | 11/2016 | Salehpour | |
| 9,575,789 B1 | 2/2017 | Rangari | |
| 2004/0049365 A1 | 3/2004 | Keller et al. | 702/186 |
| 2008/0279204 A1* | 11/2008 | Pratt, Jr. | H04W 56/002 |
| | | | 370/406 |
| 2009/0187923 A1 | 7/2009 | McKinney | 719/318 |
| 2010/0070447 A1 | 3/2010 | Pfuntner et al. | 706/47 |
| 2010/0169720 A1 | 7/2010 | Lumpp et al. | 714/50 |
| 2011/0126099 A1 | 5/2011 | Anderson et al. | 715/704 |
| 2015/0280999 A1 | 10/2015 | Chart et al. | 709/224 |
| 2017/0286690 A1* | 10/2017 | Chari | G06F 21/577 |
| 2017/0289187 A1* | 10/2017 | Noel | H04L 63/1433 |
| 2018/0109425 A1 | 4/2018 | Chart et al. | |
| 2019/0138995 A1* | 5/2019 | Currin | G06Q 50/06 |

OTHER PUBLICATIONS

Bandopadhyay, Tushar et al.; "System and Method to Propagate Information Across a Connected Set of Entities Irrespective of the Specific Entity Type"; U.S. Appl. No. 15/857,577, filed Dec. 28, 2017; consisting of Specification, Claims, Abstract, and Drawings; 62 pages.

Deng, Li et al., "vMerger: Server Consolidation in Virtualized Environment," 2013 IEEE 11$^{th}$ Int'l Conference on Dependable, Autonomic and Secure Computing, pp. 606-612.

Patil, Rushikesh et al.; "Methods and Systems for Data Resynchronization in a Replication Environment"; U.S. Appl. No. 16/805,294, filed Feb. 28, 2020; consisting of Specification, Claims, Abstract, and Drawings; 67 pages.

Patil, Rushikesh et al.; "Method and System for Data Consistency Across Failure and Recovery of Infrastructure"; U.S. Appl. No. 16/836,288, filed Mar. 31, 2020; consisting of Specification, Claims, Abstract, and Drawings; 29 pages.

Patil, Rushikesh Patil et al.; U.S. Appl. No. 16/805,292, filed Feb. 28, 2020; consisting of Specification, Claims, Abstract, and Drawings; 49 pages.

Zang, Shuanghimet al.; "Optimize Backup From Universal Share"; U.S. Appl. No. 16/835,657, filed Mar. 31, 2020; consisting of Specification, Claims, Abstract, and Drawings; 28 pages.

\* cited by examiner

METHOD AND SYSTEM FOR DEPENDENCY ANALYSIS OF WORKLOADS FOR ORCHESTRATION

CROSS-REFERENCE TO RELATED APPLICATIONS

This application claims benefit under 35 U.S.C § 119(e) of Provisional Patent Application No. 62/454,871, filed on Feb. 5, 2017, entitled "Resilient Information Technology Platform Management Across Heterogeneous Systems," and having T. Bandopadhyay, N. Moorthy, B. Dighe, M. Binwade, S. Vaidya, S. Ghare, A. Jain, A. Vaidya, R. Kayan, K. Shah, D. Kumkar, S. Tripathy, S. Hasbe, A. Deshpande, D. Maheshwari, A. Gupta, V. Kitekar, and P. Singh as inventors. The above-referenced application is hereby incorporated by reference herein, in its entirety and for all purposes.

FIELD OF THE INVENTION

This invention relates to the management of workloads in computing systems, and in particular, methods and systems for dependency analysis of workloads for purposes of orchestration.

DESCRIPTION OF THE RELATED ART

Today's organizations often rely extensively on data maintained online. Such frequently accessed, constantly changing data can be critical to the ongoing operations of such organizations. So to are computing resources, which can include not only data storage, but also computing systems (implemented using both physical and virtual components). Unplanned events that inhibit the availability of such data and systems can seriously impair business operations. Additionally, any permanent data loss, from natural disaster or other events, will likely have serious negative consequences for the continued viability of a business. Therefore, when disaster strikes, organizations must be prepared to eliminate or minimize data loss and downtime, and recover quickly with useable data and functional systems. Data backup and other disaster recovery (DR) techniques can be used to prevent the loss of data and functionality in the event of such disasters. For example, a data backup process can be used to create copies of original data. These copies can be used to restore the original data after a data loss event. Various techniques can be used to generate such backups, such full backups, incremental backups, or differential backups, as well as various types of data replication, among a variety of other techniques. In case of a failure, then, such online data processing systems should provide fast, easy, efficient functionality for recovering from such disasters. Similarly, disaster recovery architectures can be employed to ensure continuity of service.

SUMMARY OF THE INVENTION

The present disclosure describes methods, computer program products, computer systems, and the like that support the analysis of computing environments using one or more property graphs (or comparable constructs) that represent entities and one or more of their relationships to one another. The method, for example, includes selecting a node of a plurality of nodes in a property graph, analyzing entity information associated with the node, and, in response to the analyzing, storing the entity information in dependency information. Each node of the plurality of nodes represents an entity of a plurality of entities. Each node of the plurality of nodes is coupled to at least one other node of the plurality of nodes by one or more links of a plurality of links of the property graph. Each of the one or more links represents a relationship between the each node and the at least one other node. The entity information is information regarding the entity. The dependency information is configured to facilitate orchestration of one or more of the plurality of entities.

In certain embodiments, such methods, computer program products, computer systems, and the like can include determining whether the one or more links crosses a boundary and, in response to one of the one or more links crossing a boundary, recording a contact point in the dependency information.

Further, in certain embodiments, such methods, computer program products, computer systems, and the like can include traversing a link of the property graph from the node to another node of the plurality of nodes, where the link is one of the plurality of links. Further still, operations can be performed that include determining whether the link crosses a boundary and, in response to a determination that the link crosses the boundary, recording a contact point in the dependency information. It may be the case that the node is selected as a starting point in the property graph, and/or the node and the another node have a dependency relationship with one another.

Moreover, in certain embodiments, such methods, computer program products, computer systems, and the like can include determining whether the link represents a contact point and, in response to a determination that the link represents the contact point, recording the contact point in the dependency information. This and other embodiments can include determining whether the another node should be included in the dependency information, (in response to a determination that the another node should be included in the dependency information) performing the traversing and, in response to a determination that the another node should not be included in the dependency information, preventing the traversing.

In certain embodiments, such methods, computer program products, computer systems, and the like can include determining whether another link exists between the node and a subsequent node and, in response to a determination that the subsequent node should be included in the dependency information, recursively performing the traversing. In these and other embodiments, each entity of the plurality of entities can be one of a virtual computing component, a virtual storage component, a physical computing component, or a physical storage component.

BRIEF DESCRIPTION OF THE DRAWINGS

The present invention may be better understood, and its numerous objects, features and advantages made apparent to those skilled in the art by referencing the accompanying drawings.

DETAILED DESCRIPTION

Figure 1:
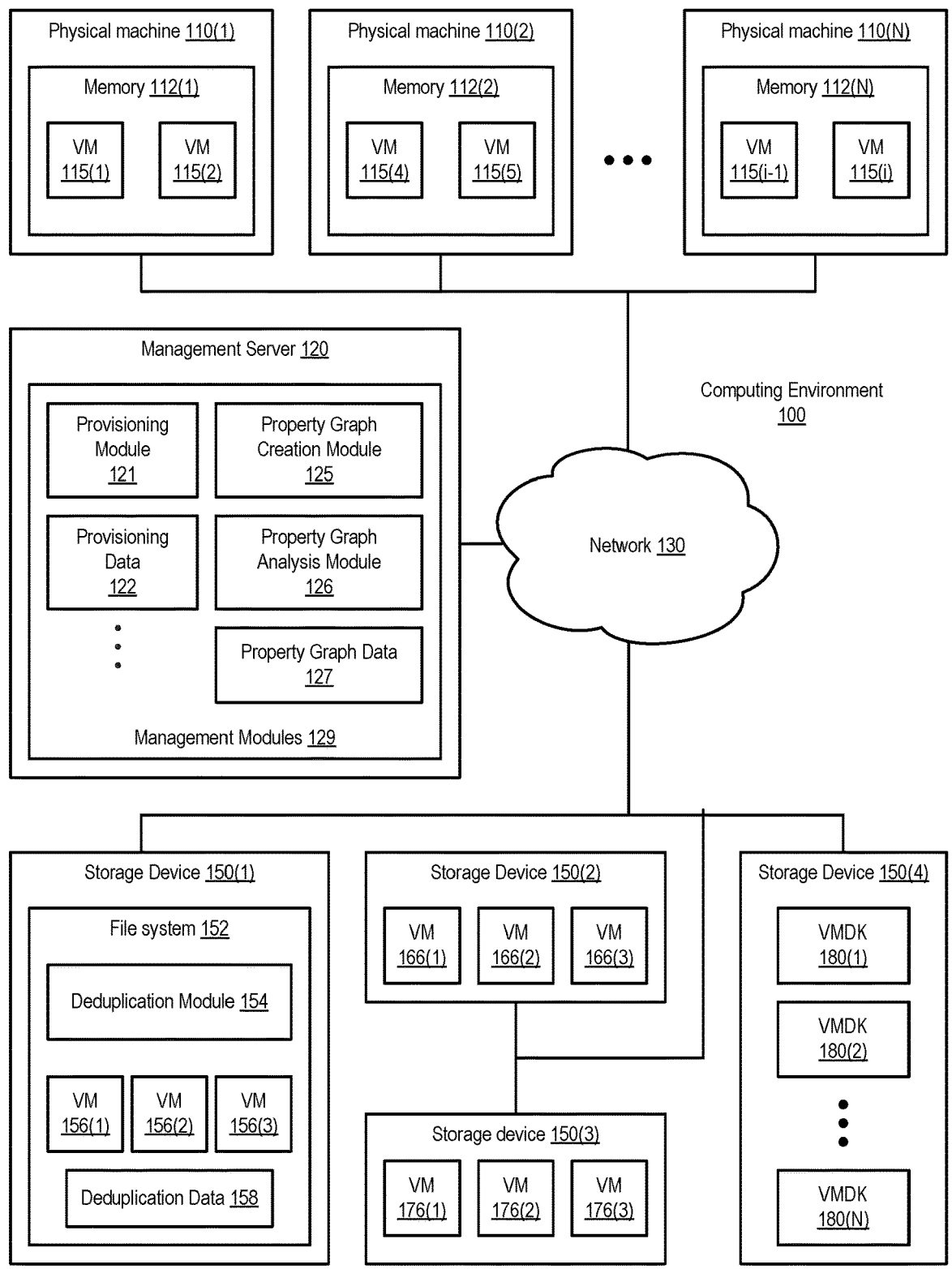
FIG. 1 is a block diagram illustrating an example of a computing environment that includes management functionality according to one embodiment.

The following is intended to provide a detailed description of an example of the invention and should not be taken to be limiting of the invention itself. Rather, any number of variations may fall within the scope of the invention which is defined in the claims following the description.

While the invention is susceptible to various modifications and alternative forms, specific embodiments of the invention are provided as examples in the drawings and detailed description. It should be understood that the drawings and detailed description are not intended to limit the invention to the particular form disclosed. Instead, the intention is to cover all modifications, equivalents and alternatives falling within the spirit and scope of the invention as defined by the appended claims.

Introduction

Methods and systems such as those described herein provide for the management of hardware and software resources in computing environments by supporting dependency analysis of workloads in a manner that is able to generate one or more results that are appropriate for use by orchestration systems. Such methods and systems facilitate the production of such results through their use of one or more property graphs (or comparable constructs.

As will be appreciated, identification of dependency mappings and infrastructure points of contact (contact points) for workloads is a fundamental part of building robust workflows for disaster recovery and migration of applications and other data center components. Often, there are multiple contact points between data center infrastructure and the workload(s) being orchestrated, any (or all) of which may contribute to the dependency needed to support the given workload.

Challenges faced in orchestration operations such as migration and disaster recovery scenarios include physically separated contact points, the segregation of such contact points, and the identification of contact points affected by such orchestration operations. Methods and systems such as those described herein address these challenges in an efficient and effective manner, as described below and elsewhere herein.

For example, in the case of geographically distributed contact points between units of infrastructure such as between data centers. Given the diversity of the workload infrastructure, different methods of data migration and type of target (hosted data center or cloud), it is challenging to identify a dependency chain which can be used to orchestrate migration of workloads along with associated data to another data center. In the case of replicated databases, upon dependency evaluation, sufficient migration contact point can be the database itself. This avoids the need to orchestrate database infrastructure like filesystems for DR and migration. In the case of VMs replicated using low-level (e.g., logical unit number (LUN) level replication, upon dependency evaluation, from VM to data stores to LUN, the migration contact point will be the LUN in question and every VM resident thereon. Another scenario is the replication of VM images outside of the system(s) supporting them (out-of-band replication). In this case, upon dependency evaluation, the migration contact point is the backup policy and the backup images generated. Here again, this avoids the need to orchestrate VM infrastructure such as data stores, LUNs, and the like.

Another example is the ability to segregate contact points. For more complex recovery configurations that have multiple data migration methods, for example, the dependencies should be segregated on a per-data migration-method basis. This can occur where low-level replication and out-of-band replication are both implemented (e.g., VM images are replicated using out-of-band replication, but the storage for the VMs is also replicated at the LUN level).

Yet another example is the identification of contact points (potentially) affected by orchestration operations. For example, with respect to maintenance operations, there can be a need to find entities which will be impacted by such operations. Here the dependencies should reflect those entities which should be stopped or disabled to be able to perform the maintenance in question. Such a situation could occur, for example where there is a need to perform maintenance on a storage device, resulting in the need for workloads using that device should be gracefully stopped, and file systems using that device to be unmounted. As will be appreciated in light of the present disclosure, the ability to quickly and efficiently determine the entities affected by such an operation through a determination of their relationship to the device(s) in question is advantageous.

Methods and systems such as those described herein provide such advantages through the use of a property graph or comparable construct. In such a construct, hardware and software components (also referred to herein as "entities") and their relationships are represented by, respectively, nodes (vertices) and links (edges). The relevant features of such a construct are the ability to provide representation of computing, network, and storage resources, generally, and to be analyzed in a manner that such information can be presented to one or more orchestration systems, in order to facilitate and support the orchestration of the entities thus represented. Thus, examples of various innovative elements of an computing environment management architecture are described, with particular emphasis on the creation and analysis of computing environments in a manner that lends itself to orchestration (e.g., for purposes of disaster recovery).

There are, presently, no solutions that provide a generic system that addresses challenges such as those described above, which extends to a flexible approach that does not rely on manually generated information (clearly, an insurmountable task in large systems with potentially hundreds or thousands of components, and an exponentially larger number of relationships therebetween). To address the challenge of quickly and efficiently determining dependency mapping(s) for data and application migration/DR operations and the contact points involved therein, and to do so in a generic manner, the following characteristics will be appreciated as being advantageous.

- Represent the entities of the connected domain by a property graph to enable autonomous computation/analysis of the connected paths to the degree desired. This will facilitate the identification of dependencies and migration contact points without explicit knowledge of the entity types and the relationship between them.
- Use case and technology agnostic analysis of the representation for identifying mapping and migration contact points in a technology thus making it less susceptible to need for modifications as newer dependencies, use cases and technologies are introduced in the environment.
- Represent the dependency mapping in a well-defined standard format which can be consumed by other systems like a workflow creation system for application and VM DR and migration automation.

To address the aforementioned needs and noted challenges, methods and systems such as those described herein provide elements such as those described below.

1. Representation of various entities in the computing environment
2. Annotation of entities
3. Identification of dependency mapping
4. Standard interface for the dependency mapping In providing such features, a computing environment management architecture according to methods and systems such as those described herein provides disaster recovery and workload management capabilities for entities such as virtual machines (VMs), as well as various applications, such as those which might be executed on a desktop computer platform. In so doing, such an architecture provides a system for managing information technology (IT) applications for numerous resiliency capabilities in various forms, with such solutions providing for, e.g., disaster recovery and workload management. To do so, methods and systems such as those described herein can employ a construct such as a property graph to represent the various entities in a computing environment, as well as the relationships that may exist therebetween. Such a representation provide a number of benefits.

Example Features of an Orchestration Architecture

A computing environment according to methods and systems such as those described herein also provides for the management of virtual machines (VMs) and other such entities (hardware and/or software components). Such entities are associated both with VMs that are to be provisioned on (and so be hosted on) a physical machine (computing system), as well with VMs that are already being hosted by such nodes. In this regard, a VM configuration can include one or more resource requirements as well as one or more additional requirements. Resource requirements indicate one or more resources that are needed in a node for hosting the given VM. Additional requirements indicate one or more operational elements needed in a node for hosting the given VM. This VM configuration is compared to configurations of various clusters. The cluster configuration can indicate configuration information for node(s) of that cluster. Such a comparison can be implemented by orchestration systems to select a cluster that includes nodes that can meet the resource and the additional requirements for hosting the given VM. A VM can be provisioned or migrated (e.g., in the event of a disaster) based on a service level agreement (SLA) associated with that VM. An SLA can include various resource requirements such as physical requirements of a node where that VM is provisioned. These resource requirements can include CPU, memory, and other hardware requirements, as well as dependencies on other entities (be they hardware or software, or a combination thereof). As a result, the VM is provisioned on (or migrated to) a server that has the resources specified by the resource requirements of the SLA associated with that VM.

As noted earlier, a virtual machine (VM) is a computing entity, such as a software construct, that provides functionality typically associated with a physical computing device. Such functionality includes, for example, the ability to run applications such as word processing, database, and web browsing programs. A virtual machine can execute an operating system, such as Windows®, Linux, Mac OS X®, and the like. A virtual machine executes on a physical machine, known as a host. Multiple virtual machines can be implemented, or provisioned, on a single physical machine. A given virtual machine is logically isolated from other virtual machines running on a physical machine (or other physical machines, of course).

When a new virtual machine is to be provisioned in an environment where multiple physical machines are available, selecting which physical machine to use for the new virtual machine is an important decision. In the case where an existing virtual machine is to be moved from one physical machine to another, e.g., if the physical machine on which the virtual machine is provisioned is being taken offline for maintenance or has failed, selecting which physical machine to migrate the existing virtual machine to is an equally important decision.

In certain situations, such provisioning is controlled by an SLA, which defines the requirements of the implementation (as noted), and which can include VM configuration, such as both resource requirements and additional requirements. Resource requirements such as physical requirements of a node where this VM can be provisioned. These resource requirements can include CPU, memory, and/or other hardware requirements. The resource requirement(s) indicate resource(s) needed in a node for hosting the VM. For example, these resources include various hardware requirements of a node for hosting the VM. As a result, the VM can be provisioned on (or migrated to) a node that has the resources specified by the resource requirements of the SLA associated with this VM.

The additional requirements indicate operational element(s) needed in a node for hosting the VM. For example, these additional requirements can include availability requirements, data protection requirements, and security requirements, among others. The availability requirements can define the VM's availability requirement(s). The data protection requirement(s) can indicate data protection elements needed in a potential node for hosting the VM. The security requirement(s) can indicate security elements needed in the potential node for hosting the VM. The operation element(s) can indicate data protection elements needed in a potential node for hosting the VM.

VM configuration information can include resource requirement(s), and one or more additional requirement(s). Such VM configuration information can be supported, implemented, accessed, and/or stored anywhere in a cluster (e.g. such configuration information can be distributed among a cluster's nodes and/or its storage). VM configuration information can also be stored outside the cluster, such as at a central repository, and be accessed via a network, for example. In one embodiment, the VM configuration is included in the VM's service level agreement (SLA). In one embodiment, the VM configuration is associated with a VM that is not yet hosted. For example, a command can be received requesting a creation of a new VM (e.g., to be provisioned at a node) according to the VM configuration. In another embodiment, the VM configuration is associated with a VM that is already being hosted on one of nodes of a cluster. For example, a command can be received requesting that a VM be provisioned at a new node according to the VM configuration.

In one embodiment, the cluster can also have an associated cluster configuration. Cluster configuration can include configuration information for the cluster and/or configuration information for node(s). For example, such cluster information can include configuration information for a given node. It is noted that cluster configurations can be supported, implemented, accessed, and/or stored anywhere in the given cluster, including being distributed among the nodes of the cluster, in cluster storage, or in storage outside the cluster, such as at a central repository, and accessed via a network, for example.

The performance of a virtual machine (either a new virtual machine or an existing virtual machine that is being migrated from one physical machine to another physical machine) and associated applications may vary depending on the physical machine selected to host the virtual machine. That is, the virtual machine's performance, e.g., speed, responsiveness, stability, may vary depending on the physical machine the virtual machine is implemented on. Running a virtual machine on a given physical machine can also affect performance of the physical machine and other processes running on the physical machine. The virtual machine may consume the physical machine's resources, resulting in fewer resources being available for other processes being executed by the physical machine, e.g., other virtual machines implemented on the same physical machine. One technique to more efficiently use the physical machine's resources is for the virtual machines implemented on the physical machine to share memory pages that are used by multiple virtual machines. That is, the physical machine's memory can be deduplicated.

In a computing environment where multiple physical machines are available to host a virtual machine, one way to select which physical machine to host the virtual machine is to compare the available resources, e.g., network transmission bandwidth, memory, processor cycles, of each physical machine and select the physical machine with the most available resources. Another way to select a physical machine from among several available physical machines is round-robin, where the available physical machines take turns hosting virtual machines that are being newly provisioned or migrated from another physical machine. Meeting terms imposed in negotiated service level agreements is sometimes an important consideration in placing virtual machines.

In addition to the foregoing resource considerations, resource requirement(s) information can define, generally, the VM's various resource requirements (and "preferences" for optimal and/or acceptable operation). Resource requirements can include CPU, memory, network, platform, boot disk image, and so on. These are typically hardware requirements of the node (e.g., a server) for hosting a VM. Additional requirement(s) can include availability requirements, data protection requirements, and security requirements, as well as dependence on other components (e.g., hardware and/or software components).

Availability requirements can define the VM's availability requirement(s), e.g., the number of physical host failures that the virtual machine needs to be able to tolerate, the number of remote sites configured for the virtual machine's disaster recovery, etc. For example, a requirement could include that a VM needs to tolerate N physical host failures. This requirement can be met by the clusters having at least N+1 physical hosts capable of meeting the VM's resource requirement(s). In another example, a requirement can include a VM tolerating one site failure, i.e., it needs to have a Disaster Recovery setup. This requirement can be met only by the clusters in the data centers that have Disaster Recovery (DR) configured, such as where there is a cluster (e.g., at a remote site) that can be used to activate the virtual machines active on the cluster. For example, a cluster in New York could have a corresponding DR cluster setup in London. If a host in the New York cluster fails, the virtual machines that were active on the cluster in New York can be made available via the DR cluster in London.

Security Requirements define the security zones for the virtual machine to restrict the networks that the virtual machine will have access to, policies and frequency for malware scanning, etc. For example, a requirement may be to scan a VM disk image for virus every N hours. This requirement can be met by setting virus scan software within a VM and/or the node hosting a VM. Alternatively, this requirement can be done offline from wherever VM image is accessible, e.g., where the VM image is placed, or another host that has access to the virtual machine's disk image. In another example, a requirement can be to have a virtual infrastructure be compliant to some guidelines. This requirement can be met by checking the hypervisor, network, storage for compliance with compliance assessment systems. Another example of a requirement is that the VM needs to be provisioned on a host that has DLP gateway configured to scan all outbound traffic. This SLA can be met by hosts that have DLP gateway that can be configured to scan all outbound traffic of a VM.

Data Protection Requirements define the frequency, media and method/type for the backup or the snapshot of the virtual machine. For example, a requirement may be that an image needs to be backed up every H hours using a particular type of backup software. Another requirement may require use of a certain type of backup, such as incremental or full backup. This requirement can be met by hosts that have appropriate backup software setup and have access to backup media.

In this vein, as will be appreciated in light of the present disclosure, a virtual machine and virtual machine data associated therewith (often organized as a virtual disk) can be backed up to provide data protection for the virtual machine and virtual disk. The backed-up virtual machine and virtual disk can be restored to resume or begin virtual machine operations. For example, in a disaster recovery scenario, a virtual machine that has been inoperable due to a crash of the node hosting the virtual machine can be restored from backup to another host and operations can be resumed. In another embodiment, a virtual machine and virtual disk can be restored from backup to a host and operations can begin, thus creating multiple instances of the same virtual machine. Restoring the virtual machine can typically be performed relatively quickly as the virtual machine itself includes a relatively small amount of data (e.g., on the order of kilobytes or megabytes). Restoring the virtual disk typically takes longer as the virtual disk typically includes a relatively large amount of data (e.g., on the order of gigabytes).

Example Orchestration Architecture

FIG. 1 is a block diagram of a computing environment 100. As shown, computing environment 100 includes several physical machines 110(1)-110(N) (computing systems). Each physical machine 110 hosts several virtual machines 115(1)-115(i). It is noted that alternative embodiments can implement different numbers of physical machines, different numbers of virtual machines per physical machine, and the same system can include one or more physical machines that each implement a different number of virtual machines than other physical machines within the same environment.

It will be noted that the variable identifiers such as those used above ("N" and "i") are used to more simply designate the final element (e.g., physical machine 110(N)) of a series of related or similar elements (e.g., physical machines). The repeated use of such variable identifiers is not meant to imply a correlation between the sizes of such series of elements, although such correlation may exist. The use of such variable identifiers does not require that each series of elements has the same number of elements as another series delimited by the same variable identifier. Rather, in each instance of use, the variable identified may hold the same or a different value than other instances of the same variable identifier.

Physical machines 110 are coupled to a management server 120 and a number of storage devices 150(1)-150(4) by a network 130. Network 130 can include a WAN (Wide Area Network), such as the Internet, one or more LANs (Local Area Networks), and/or one or more SANs (Storage Area Networks), among other such constructs and systems.

Physical machines 110 are computing devices, or portions of computing devices, an can be computing devices of any sort, such as personal computers, laptop computers, servers, personal digital assistants, cell phones, or the like. In some embodiments, such physical machines are included in a cloud computing environment in which physical computing resources, such as memory and processor cycles, are allocated on an as-needed and/or as-contracted basis. The resources of a physical machine 110 are shared by any virtual machines that are implemented on the physical machine. Physical machines 110 each include memory 112. Memory 112 is, in an embodiment, random access memory (RAM). Memory 112 is organized into a number of pages. A page is generally a fixed size portion of memory, for example a 4 kilobyte (Kb) portion of memory.

Virtual machines 115 can be used to provide computing resources, for example, to a user associated with an organization. When a user, e.g., an information technology (IT) professional in an organization, requests additional resources an administrator (e.g., IT professional) at the cloud vendor, can provision one or more additional virtual machines to satisfy the request for additional resources. In an embodiment, a provisioning module 121 can be employed to detect requirements specified by a user in a request for computing resources. Provisioning module 121, which uses provisioning data 122 to performs its functions, can automatically create or locate a virtual machine in response to the request and cause the virtual machine to be provisioned on one of physical machines 110. As can be seen, provisioning module 121 (and its associated provisioning data 122), as well as a property graph creation module 125 and a property graph analysis module 126 (and associated property graph data 127), are among the modules supported by management server 120 (which modules are depicted, as examples, in FIG. 1 as management modules 129). The operation of systems such as property graph creation module 125 and property graph analysis module 126 are described subsequently, as well as in connection with and as related to FIGS. 3-16.

The administrator can also move one or more virtual machines from a first physical machine to an alternate physical machine. For example, an administrator can move (migrate) one or more virtual machines to a different (target) physical machine in response to detecting that a physical machine is failing, has failed, is overloaded, or that additional resources are available on a different physical machine from the physical machine currently hosting the one or more virtual machines. In an embodiment, provisioning module 121 can automatically detect a condition that indicates a virtual machine should be migrated, such as detecting that a physical machine is failing, has failed, is overloaded, or that additional resources are available on a different physical machine from the physical machine currently hosting the one or more virtual machines. Provisioning module 121 can automatically migrate one or more virtual machines in response to detecting such a condition, as part of providing orchestration services.

Management server 120 can be, fore example, a computing device, or portion of a computing device, such as a personal computer, laptop computer, server, personal digital assistant, cell phone, or the like. Management server 120 can select a target physical machine to host a new or migrated virtual machine. Management server 120 includes a provisioning module 121 and provisioning data 122.

Provisioning module 121 can select a target physical machine based upon the likelihood that a new virtual machine (or a virtual machine being migrated from one physical machine to another physical machine) will more effectively utilize resources (e.g., memory) of the target physical machine (e.g., by virtue of sharing a greater number of memory pages with one or more virtual machines that are or will be hosted by the target physical machine). Further, such operations can be performed in an intuitive, efficient manner, using a graphical user interface (GUI) presented for the administration of management server 120.

Provisioning module 121 can collect and maintain information regarding provisioning using provisioning data 122, and determine the manner in which one or more virtual machines, their associated storage components (virtual machine disks (VMDKs)), associated functionality, and the like are provisioned to make appropriate (or simply acceptable) use of the available resources. This can be, for example, the determination to accept a given VM (e.g., indicating which physical machine is likely to share the largest number of shared memory pages with a given virtual machine and store the information in provisioning data 122). Provisioning module 121 can analyze provisioning data 122 to select which physical machine is to host a virtual machine. Provisioning module 121 can collect provisioning data 122 in various forms from various sources. Provisioning module 121 can also keep track of the data being maintained each physical machine's memory. In an embodiment, each physical machine periodically transmits information regarding the pages stored in the physical machine's memory to provisioning module 121. Alternatively, the physical machine in question can transmit the list in response to adding a new page to memory, in response to a new virtual machine being provisioned on the physical machine, and/or in response to a request by provisioning module 121 for a list of entries. In an embodiment, each entry includes an address, e.g., an address of a page. In one embodiment, such information can include a tag that identifies a characteristic of one or more virtual machines hosted by the physical machine, such as an operating system or application used by a virtual machine hosted by the physical machine.

In an embodiment in which a virtual machine is running on a physical machine and is being migrated to another physical machine, provisioning module 121 can use resource information (e.g., memory information) from the physical machine on which the virtual machine is running, to determine to which of multiple available physical machines (target physical machines) the virtual machine should be migrated. Using the present example, provisioning module 121 can compare information regarding the virtual machine (as received from the physical machine that is hosting the virtual machine) with information for each of the target physical machines, in order to identify one more candidates to which the given virtual machine might be migrated.

When a virtual machine is not already running on a physical machine, such as when a new virtual machine is being provisioned, management server 120 can perform operations to provision the virtual machine, determining the computing resources needed by the virtual machine being provisioned. In an embodiment, provisioning module 121 receives virtual machine information from a storage device, such as one of storage devices 150, instead of and/or in addition to receiving from the physical machines. Storage devices 150 provide persistent data storage, such that data stored on such a storage device will remain stored even after the storage device is powered off. Such a storage device can be, for example, a hard disk, a compact disc (CD), a digital versatile disc (DVD), or other mass storage device, or a storage system (e.g., a redundant array of independent disks (RAID) system or an optical storage jukebox) that includes an array of such storage devices. Such a storage device can also be a virtual or logical storage device that is implemented on such physical storage devices and/or storage systems. For example, such a storage device can be a logical volume that is implemented on a RAID storage system. Additionally, such a storage device can include one or more storage devices. A storage device can also include one or more types of storage media, including solid state media (e.g., flash drives), optical media (e.g., CDs and DVDs), and magnetic media (e.g., hard disks or magnetic tape). In some embodiments, such storage devices can be implemented using cloud storage, in which the storage device is a logical storage device to which physical storage device(s) are allocated on an as-needed and/or as-contracted basis.

A number of virtual machines (e.g., VMs 156(1)-(3), 166(1)-(3), and 176(1)(3)) can be stored on one or more of storage devices 150 (e.g., storage devices 150(1)-(3)), as can one or more VMDKs (e.g., VMDKs 180(1)-(N), stored on storage device 150(4)). Provisioning module 121 can obtain information regarding one or more of these virtual machines and provision the virtual machine(s) in question. Provisioning module 121 can also obtain information regarding one or more of virtual machines 115, in order to store the virtual machine(s) in question. As depicted in FIG. 1, storage device 150(1) implements a file system 152, which includes a deduplication module 154. File system 152 supports deduplication of data stored therein, including virtual machines 156. In this example, virtual machines 156(1)-156(3) are deduplicated. That is, each virtual machine 156 is formed of a set of data. In certain embodiments, a virtual machine 156 includes identical data as another of virtual machine 156. This is likely in cases where two or more virtual machines 156 include identical applications and/or operating systems. When multiple virtual machines 156 include identical data, storage device 150(1) stores only a single copy of the identical data. Deduplication data 158 thus includes information identifying which portions of data that make up virtual machines 156 is shared among the virtual machines, e.g., identical between two or more virtual machines 156. Provisioning module 121 can use deduplication data 158 to select a physical machine to host one of virtual machines 156.

Such storage devices can also include one or more fingerprint modules that can calculate fingerprints for the stored virtual machines and store the fingerprints thus generated in fingerprint data on one or more of storage devices 150. Calculating fingerprints for a virtual machine involves dividing the virtual machine image and any data related to the virtual machine into chunks, and calculating a fingerprint for each chunk. A chunk is a fixed or variable length portion of data. Fingerprint module 162 can utilize various functions to generate a signature, or fingerprint for each chunk. Such functions can include one or more of, for example, a Secure Hash Algorithm (SHA), Message-Digest Algorithm 5 (MD5), a Rabin hash, a Cyclic Redundancy Check (CRC) and/or the like. For instance, a signature may be a hash that is generated by a hash function, such as SHA-1, that processes a particular chunk and in response computes the hash (e.g., a SIS-level signature).

In such a scenario, provisioning module 121 receives information from storage devices 150 regarding what fingerprints are stored in the resulting fingerprint data. One or more of storage devices 150 can transmit information regarding fingerprints to provisioning module 121 periodically, in response to the addition of new fingerprints (e.g., if a new virtual machine is stored in one of storage devices 150), and/or in response to a request by provisioning module 121. Such a request can specify one or more virtual machines for which fingerprint data should be transmitted to provisioning module 121.

In an environment such as computing environment 100, methods and systems such as those described herein include, as noted, property graph creation module 125 and property graph analysis module 126, as well as the property graph data created/analyzed (e.g., property graph data 127), in support of orchestration functions provided by one or more of the management modules that make up management modules 120. As will be appreciated in light of the present disclosure, property graph creation module 125 provides functionality that facilitates the creation of property graph data such as property graph data 127, while property graph analysis module 126 provides functionality that facilitates the analysis of such property graph data, as well as generating information that is in a form that is amenable to use by one or more orchestration systems. Examples of such functionality are given, for example, in connection with FIGS. 8, 9, and 10 (with respect to property graph creation module 125), and FIGS. 8, 11, and 12 (with respect to property graph analysis module 126 and the orchestration systems making use of its output).

Figure 2:
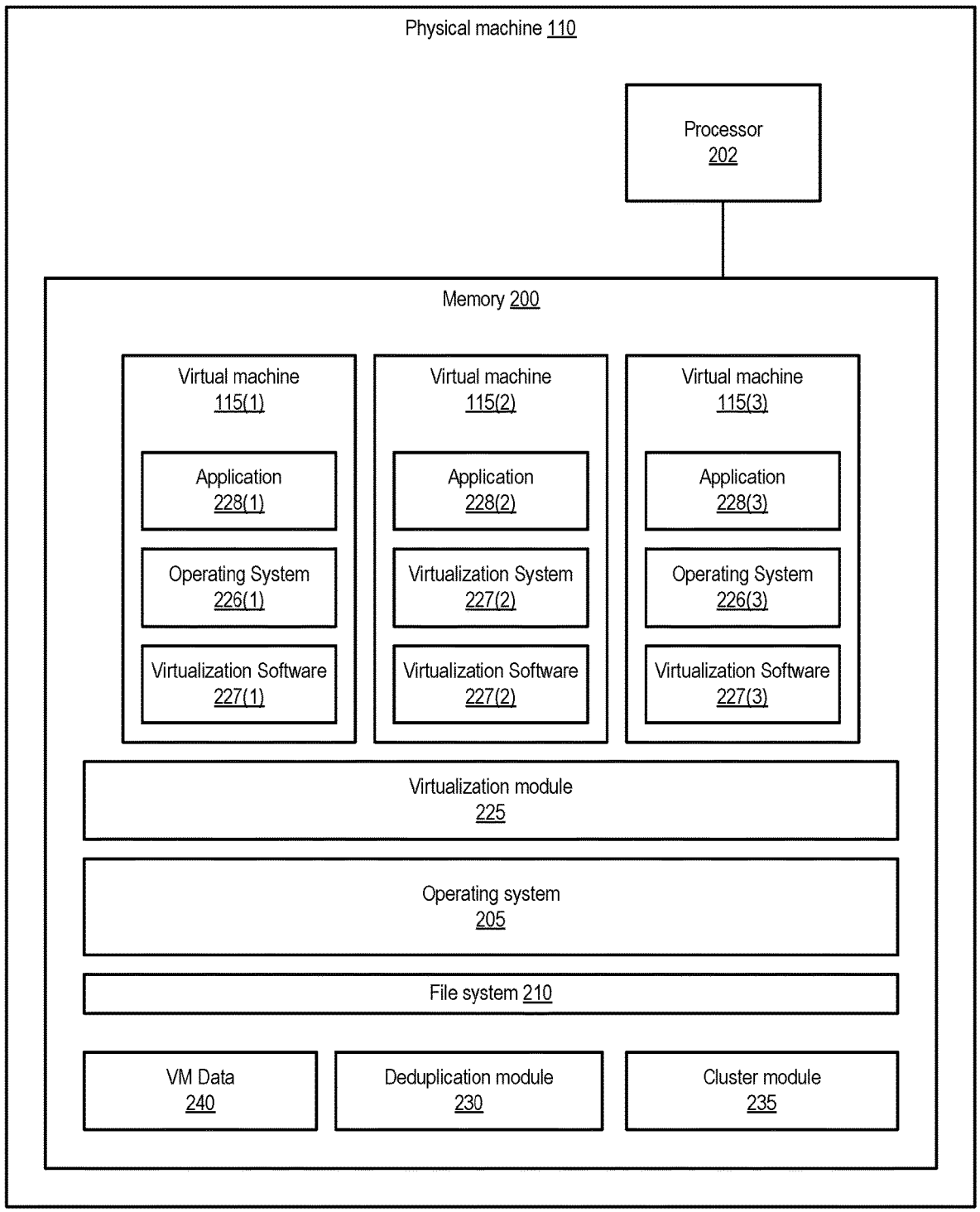
FIG. 2 is a block diagram illustrating an example of a physical machine supporting multiple virtual machines (VMs) and other functionality, according to one embodiment.

FIG. 2 is a block diagram of a physical machine 110. Physical machine 110 includes a memory 200 and a processor 202. Physical machine 110 also includes several virtual machines 115(1)-115(3). While three virtual machines are shown, physical machine 110 can support more or fewer virtual machines.

Memory 200 includes an operating system 205. Operating system 205 controls the hardware of physical machine 110 and provides various services to applications and virtual machines executing on client physical machine 110. For example, when a virtual machine 115 requests a page be brought into memory 200 (via a virtualization module such as virtualization module 225 (e.g., a hypervisor or the like)), operating system 205 can relay the request to file system 210, which can request that the page be read, e.g., from file data in one of storage devices 150. File system 210 can receive the page and write the page to memory 200, e.g., to virtual machine data 240. File system 210 can organize data, such as file data in one of storage devices 150, into files and directories. File system 210 can maintain a listing of the physical locations of files and data in one or more of storage devices 150.

Memory 200 includes a deduplication module 230. Deduplication module 230 can perform deduplication operations related to memory 200, including virtual machine data 240. When a specified unit of data, e.g., a page, is to be loaded into memory 200, deduplication module 230 determines whether a unit of data containing identical data already exists in memory 200, e.g., the data may have been requested by another virtual machine hosted on physical machine 110, and allow access thereto.

In an embodiment, deduplication module 230 is notified of the page request by file system 210. To determine whether the page already exists in memory, deduplication module 230 calculates a signature, e.g., fingerprint, for the page and compares the fingerprint with a list of fingerprints stored in virtual machine data 240. If the fingerprint exists in the list, the page is redundant, and deduplication module 230 can notify file system 210 to cancel the load. If the fingerprint is not found, the page is not already stored in virtual machine data 240 and deduplication module 230 adds the fingerprint to the list of fingerprints and allows the load to proceed. Virtual machine data 240 includes data used by virtual machines 115, as well as a list of fingerprints for the data.

Memory 200 includes a virtualization module 225. Virtualization module 225 performs operations related to creation and management of virtual machines and resources for virtual machines. Virtualization module 225 is illustrated as a stand-alone module but can also be included in operating system 205. Virtualization module 225 provides physical machine 110 the ability to concurrently support one or more virtual machines, such as virtual machines 115. Virtualization module 225 provides this ability by coordinating the distribution of computer resources (e.g., processing power, memory, etc.) to the virtual machines so that the virtual machines operate similarly to physical computers. Virtualization module 225 can be designed to support virtual machines by coordinating processor resources to support the execution of instructions on behalf of the virtual machines, and performing memory management to help ensure that the virtual machines effectively share the host computer's system memory. Further, certain embodiments of virtualization module 225 need no host operating system (commonly referred to as a "bare metal hypervisor" or the like).

Memory 200 includes a cluster module 235. In an embodiment, it may be desirable to make a placement or migration decision for multiple virtual machines at once. In such an embodiment, a placement server can form clusters of similarly situated virtual machines. The size of a cluster can depend on various factors, such as available resources on each physical machine, resource requirements of the virtual machines, and the like. Various algorithms can be used for clustering.

Physical machine 110 also includes virtual machines 115(1)-115(3). In general terms, virtual machines 115 are software constructs that act as physical computer systems. For instance, virtual machines 1115 can include and execute applications, provide services, and process commands. A virtual machine has its own operating system, such as Microsoft Windows®, Unix, or the like, and can interface with virtualization software on a host, such as is provided virtualization module 225 on physical machine 110.

Examples of Architectural Features and Representational Constructs Thereof

Figure 3:
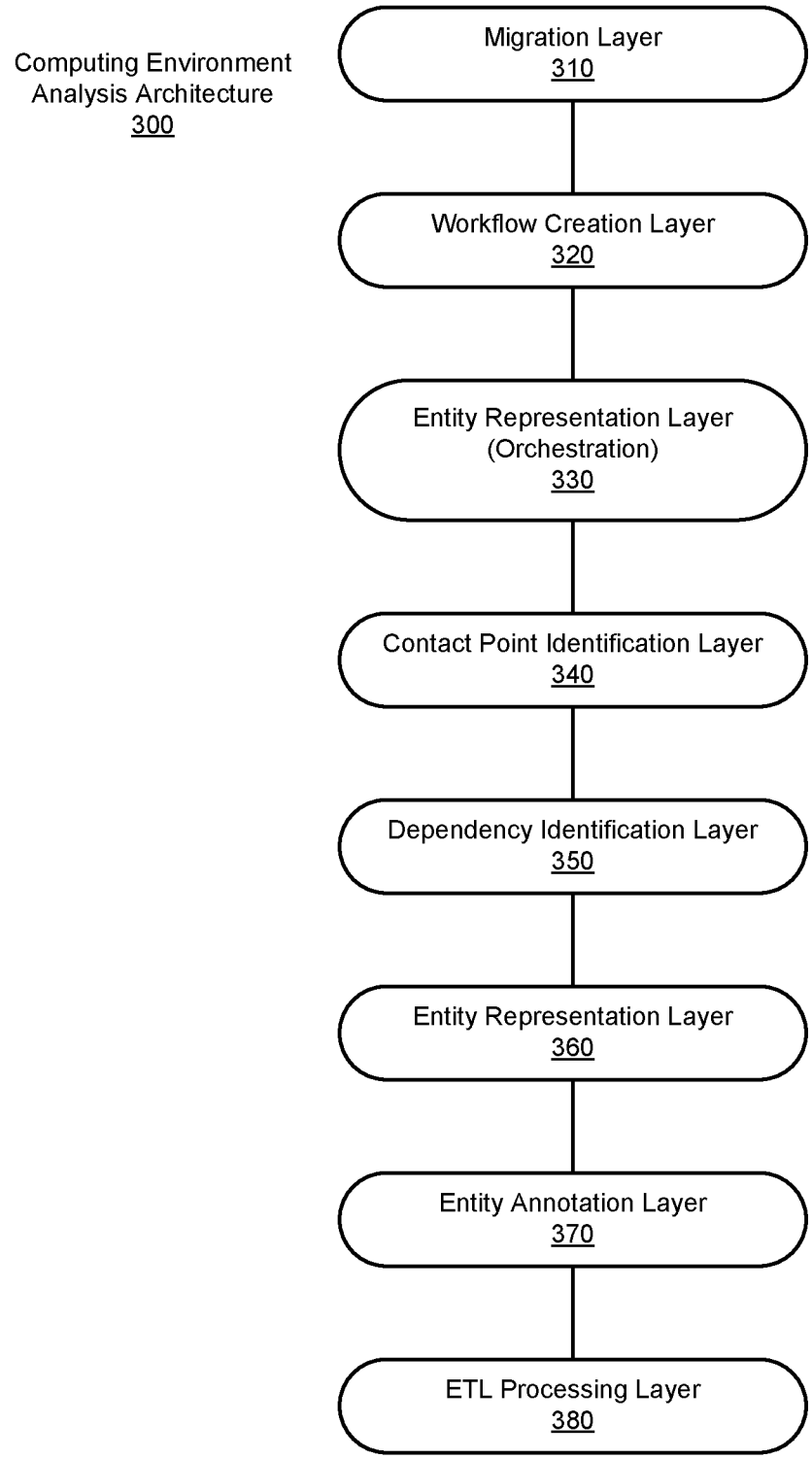
FIG. 3 is a block diagram illustrating an example of a computing environment analysis architecture, according to one embodiment.

FIG. 3 is a block diagram illustrating an example of a computing environment analysis architecture, according to one embodiment. As noted, methods and systems such as those described herein provide elements such as those described below.

1. Representation of various entities in the computing environment
2. Annotation of entities
3. Identification of dependency mapping
4. Standard interface for the dependency mapping With regard to entity and relationship representation, methods and systems such as those described herein represent the entity records fed by one or more extract/transform/load (ETL) processes into a representational construct such as a property graph. This results in a graph abstraction of entities and their relationships with one another, where entities are represented as vertices of such a property graph and their relationships are represented as edges of such a property graph.

Such methods and systems, as well as representational constructs, provide for annotation of entities. The entities which can be orchestrated (e.g., entities that support operation interfaces, such as, for example, up-down, enabled-disabled and so on) can be annotated. Examples of such entities are applications, virtual machines, file systems, data stores, array consistency groups, and so on.

Such annotations can include, for example:
_ecosystem (_e): Grouping of entities by operations possible on them. Examples include compute, storage, network, replication, cloud, and so on.
_technology (_t): The name of technology which enables the ecosystem. Examples include VM entities, replication entities, cloud entities, and so on.

Certain entities may not be amenable to orchestration, certain orchestration operations, or orchestration during certain system operations, or may never be amenable to orchestration (e.g., a physical machine cannot be migrated, save for by physically moving the unit). As a result, such entities may not require (or may even be unable to be) orchestrated (e.g., physical servers, enclosures, hypervisors, and the like).

Entities which are configured for data transfer (replication/copy) can thus be annotated with a property.

_replicated: For example, the annotation for replicated entities is _replicated. Examples of such entities are replicated LUNs, backup images which are replicated using out-of-band replication, replicated data stores, and/or the like.

_copy: The snapshots and backup copies are additionally annotated with _copy.

Methods and systems such as those described herein also support the identification of dependency mappings. Identification of the dependency mappings involved is an iterative process of identifying the optimal ordered collection of entities and relationships for a given workload.

System traverses down the hierarchy of entities starting from selected workloads on the source data center.

It records the entities which are annotated with _technology.

Entities which are annotated with _replicated are recorded as migration contact point for the source data center.

For such entities, system looks for related entities on the target data center, by interrogating the relationships and selecting path which is also annotated with _replicated and records them as migration contact points on the target data center.

There can be more than one remote targets depending on how the replication/copy is configured.

System traverses up the hierarchy of entities starting migration contact points on the target data center.

It records the entities which are annotated with _technology.

Methods and systems such as those described herein also provide for a standard representation. Such a process gives an ordered list of entities on source and target data centers. The system then consolidates the entities in the groups of ecosystem and technology to provide a view of various layers which can be orchestrated.

Simply put, when using a property graph as a representational construct, such a property graph, in which both vertices and edges have properties (key value pairs, where the key is the attribute name), can be used to maintain information regarding entities and their relationships, as noted. The advantage here is that because such a representational construct has properties on edges as well, traversals can also take into account the characteristics of the path/relationship, the traverser can stamp properties on the edges/relationships as a permanent or temporary tag which can be used subsequently during analysis. An example of the types of information (and so, characteristics) that such a representational construct can include appear below:

Vertex 1:

```
{
    _type: "host"
    id: "12345231"
    _technology: "VMware"
    _environment: "virtualization"
    platform: "ESXi"
    ncpu: 16
}
```

Vertex2:

```
{
    _type: "disk"
    id: "98345231"
    _environment: "virtualization"
    size: "16GB"
    type: "SSD"
}
```

Vertex3:

```
{
    _type: "disk"
    id: "98345232"
    _environment: "virtualization"
    size: "16GB"
    type: "SSD"
}
```

Edge between vertex1 and vertex2:

```
{
    label: "has"
    mode: "READ-WRITE"
}
```

Edge between vertex1 and vertex3:

```
{
    label: "has"
    mode: "READ-ONLY"
}
```

As can be seen above, certain characteristics (_type, _environment, and so on) can be used to make determinations as to the appropriate management of the given entities, and to determine dependency relationships therebetween.

In view of the foregoing, FIG. 3 depicts a computing environment analysis architecture 300. Computing environment analysis architecture 300 includes a number of software and/or hardware layers, which can be implemented as, for example, separate modules, as will be appreciated in light of the present disclosure. Further, one or more of the layers depicted in FIG. 3 can be combined with others depicted therein, removed, augmented by other layers, and so on. The layers of computing environment analysis architecture 300, as depicted in FIG. 3, include a migration layer 310, a workflow creation layer 320, and entity representation layer (orchestration) 330, a contact point identification layer 340, a dependency identification layer 350, an entity representation layer 360, an entity annotation layer 370, and ETL (extract/transform/load) processing layer 380. As a prerequisite to performing orchestration on one or more of the entities of the given computing environment, a construct such as the property graph described herein (or comparable such construct) that represents various virtual and physical hardware and software units of the given computing environment are represented as entities and their relationships in such a construct. These entities and relationships represent various hardware and software units within a computing environment such as a data center, for example. Such a construct can be annotated with the characteristics of the given entity, and such information can then be used by an orchestration system to orchestrate those entities. Annotation of such entities can include information identifying the entity's ecosystem, technology, whether or not the entity is replicated, whether or not the entity is copied, and other such characteristics. Through the use of such a construct, methods and systems such as those described herein provide for the identification of dependency mapping and the migration of affected entities based on contact points for a given workload. That being the case, such a construct can be traversed within the source computing environment (e.g. data center), and thus permit the recordation of information regarding such entities and their relationships. For example, entities marked with a given marker (e.g., technology), allow an analysis process (e.g., a property graph analysis process such as that described herein) to record information regarding entities can subsequently be migrated as part of the operation of the given orchestration system. Such traversal can also switch to a target computing environment (e.g., data center) based on entities that are marked as being replicated or copied. In so doing, such a traversal can traverse boundaries between data centers.

As a result, in such instances, a property graph can be traversed to a target data center, allowing for the recordation of entities in the target data center that are also marked as being associated with the given technology (e.g., virtual devices that can be migrated). Further, traversal paths can be customized (e.g., by way of a user interface presented to an administrator) to account for external pluggable rules, as well as other manually-entered guidance for the analysis system. By using a workflow-friendly representation such as a property graph, an analysis system such as that described herein is able to provide an ordered list of entities on, for example, source and target data centers. Further, such representation consolidates the entities into groups of ecosystem and technology to provide a view of various layers which can be orchestrated by the given orchestration system.

Figure 4:
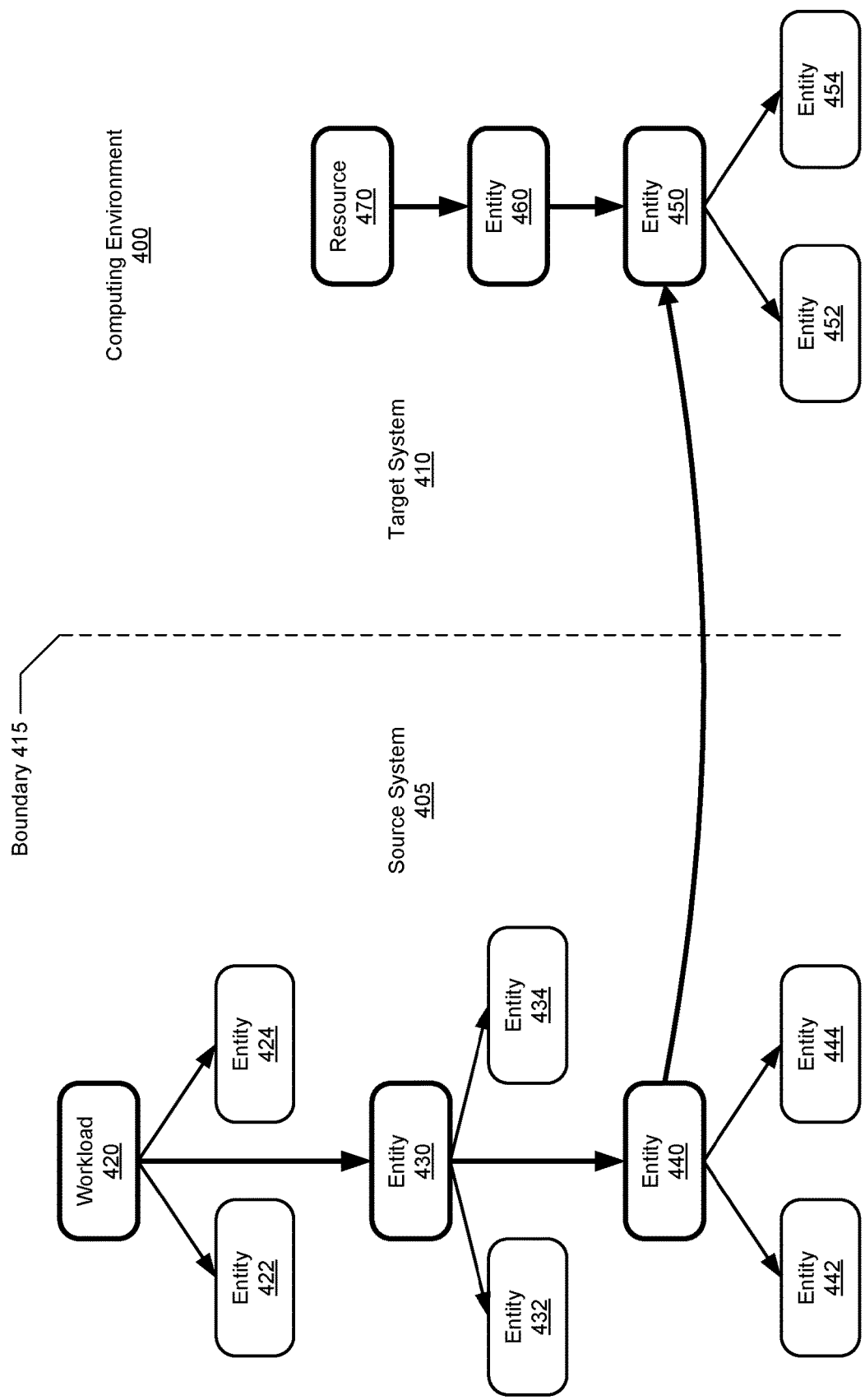
FIG. 4 is a block diagram illustrating an example of a computing environment, according to one embodiment.

FIG. 4 is a block diagram illustrating an example of a computing environment, according to one embodiment. FIG. 4 thus depicts a computing environment 400 that, in turn, includes a source system 405 and a target system 410, separated by a boundary 415. Examples of boundaries such as boundary 415 can be logical (e.g., different virtual networks, different network domains, and so on) or physical (e.g., physically separated by distance, physically distinct networks, and so on). That being the case, one of the challenges faced in analyzing dependencies in computing environments such as computing environment 400 include the need to determine dependencies across boundaries such as boundary 415.

Computing environment 400, as depicted in FIG. 4, includes an entity depicted as a workload 420. Workload 420 has relationships with entities 422 and 424, and also with an entity 430. Source system 405 also includes entities 432, 434, 440, 442, and 444. Entity 430, as depicted, has relationships with entities 432, 434, and 440. Entity 440 in turn, has relationships with entities 442 and 444. Entity 440 also has a relationship with an entity in target system 410 (depicted in FIG. 4 as entity 450). Entity 450 has relationships not only with entities 452 and 454 of target system 410, but is also related to an entity 460, which, in turn, is related to an entity depicted in FIG. 4 as a resource 470. The representation of computing environment 400 depicted in FIG. 4 allows for the traversal of the entities and relationships depicted therein. Identification of an optimal dependency mapping and infrastructure contact points is important to building workflows that support orchestration operations such as disaster recovery and migration of application and data centers. Such dependencies are illustrated in FIG. 4 by the heavier line-widths used for certain of the entities and relationships. For example, workload 420 depends on entity 430, which, in turn, depends on entity 440. Entity 440, in source system 405, depends on entity 450 in target system 410. Dependency relationships also exist between resource 470, entity 460, and entity 450 in target system 410. Thus, by traversing a construct that represents these entities and their relationships, a dependency analysis system according to the methods and systems described herein, is able to produce an ordered representation of the entities in question, and thereby support orchestration operations on the hardware and software units represented thereby.

Figure 5:
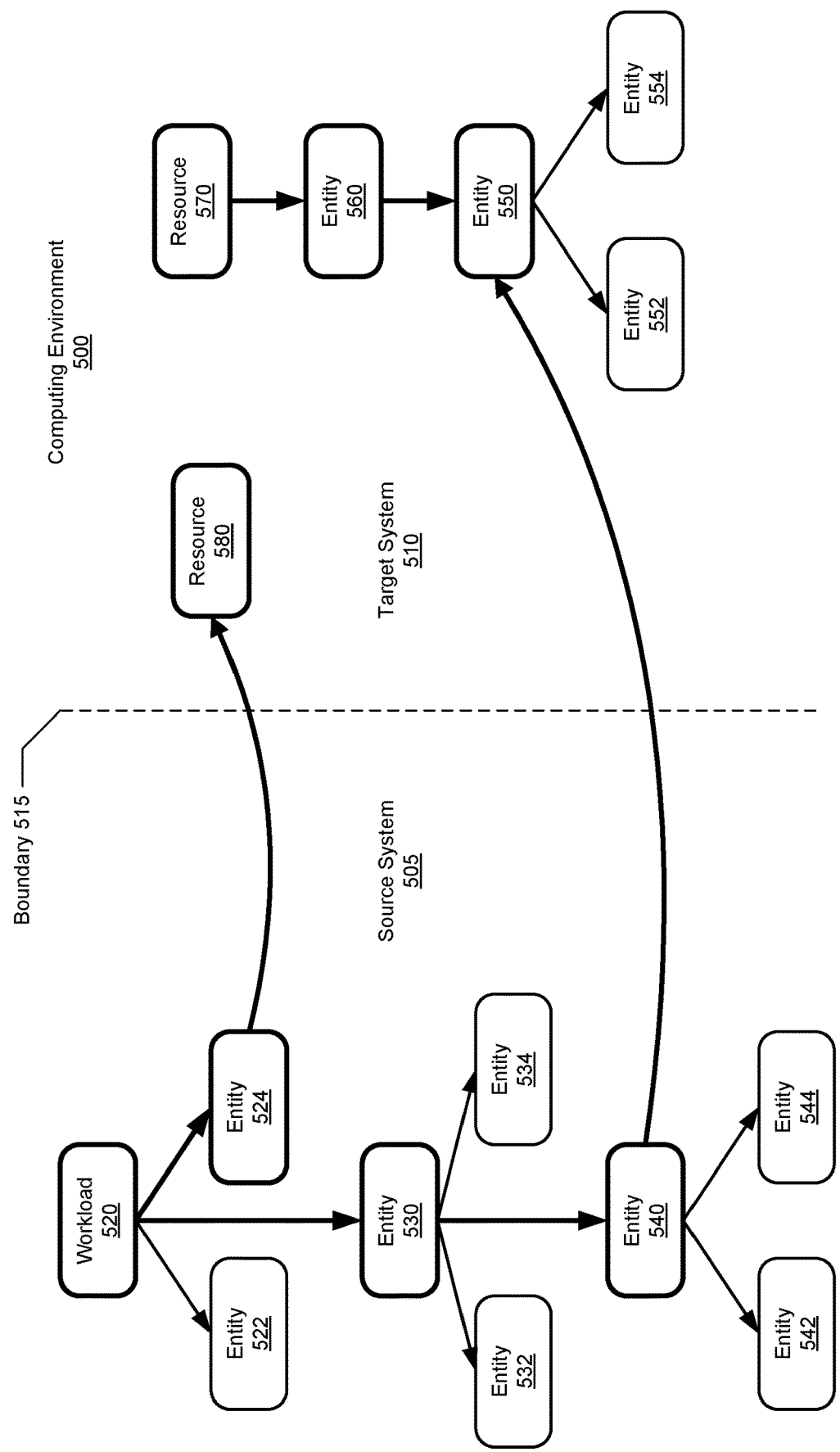
FIG. 5 is a block diagram illustrating an example of a computing environment having multiple contact points, according to one embodiment.

FIG. 5 is a block diagram illustrating an example of a computing environment having multiple contact points, according to one embodiment. Workload 520 has relationships with entities 522 and 524, and also with an entity 530. Source system 505 also includes entities 532, 534, 540, 542, and 544. Entity 530, as depicted, has relationships with entities 532, 534, and 540. Entity 540 in turn, has relationships with entities 542 and 544. Entity 540 also has a relationship with an entity in target system 510 (depicted in FIG. 5 as entity 550). Entity 550 has relationships not only with entities 552 and 554 of target system 510, but is also related to an entity 560, which, in turn, is related to an entity depicted in FIG. 5 as a resource 570.

The representation of computing environment 500 depicted in FIG. 5 allows for the traversal of the entities and relationships depicted therein, in the manner noted earlier. Identification of an optimal dependency mapping and infrastructure contact points is important to building workflows that support orchestration operations such as disaster recovery and migration of application and data centers. Such dependencies are illustrated in FIG. 5 by the heavier line-widths used for certain of the entities and relationships. For example, workload 520 depends on entity 530, which, in turn, depends on entity 540. Entity 540, in source system 505, depends on entity 550 in target system 510. Dependency relationships also exist between resource 570, entity 560, and entity 550 in target system 510. Thus, by traversing a construct that represents these entities and their relationships, a dependency analysis system according to the methods and systems described herein, is able to produce an ordered representation of the entities in question, and thereby support orchestration operations on the hardware and software units represented thereby. Also depicted in FIG. 5 is a relationship between entity 524 and a resource 580. As will be appreciated in light of the present disclosure, the relationship between entity 524 and resource 580 crosses boundary 515. This information is associated with the edge between entity 524 and resource 580 in the manner of the relationship between entity 540 and entity 550.

Figure 6:
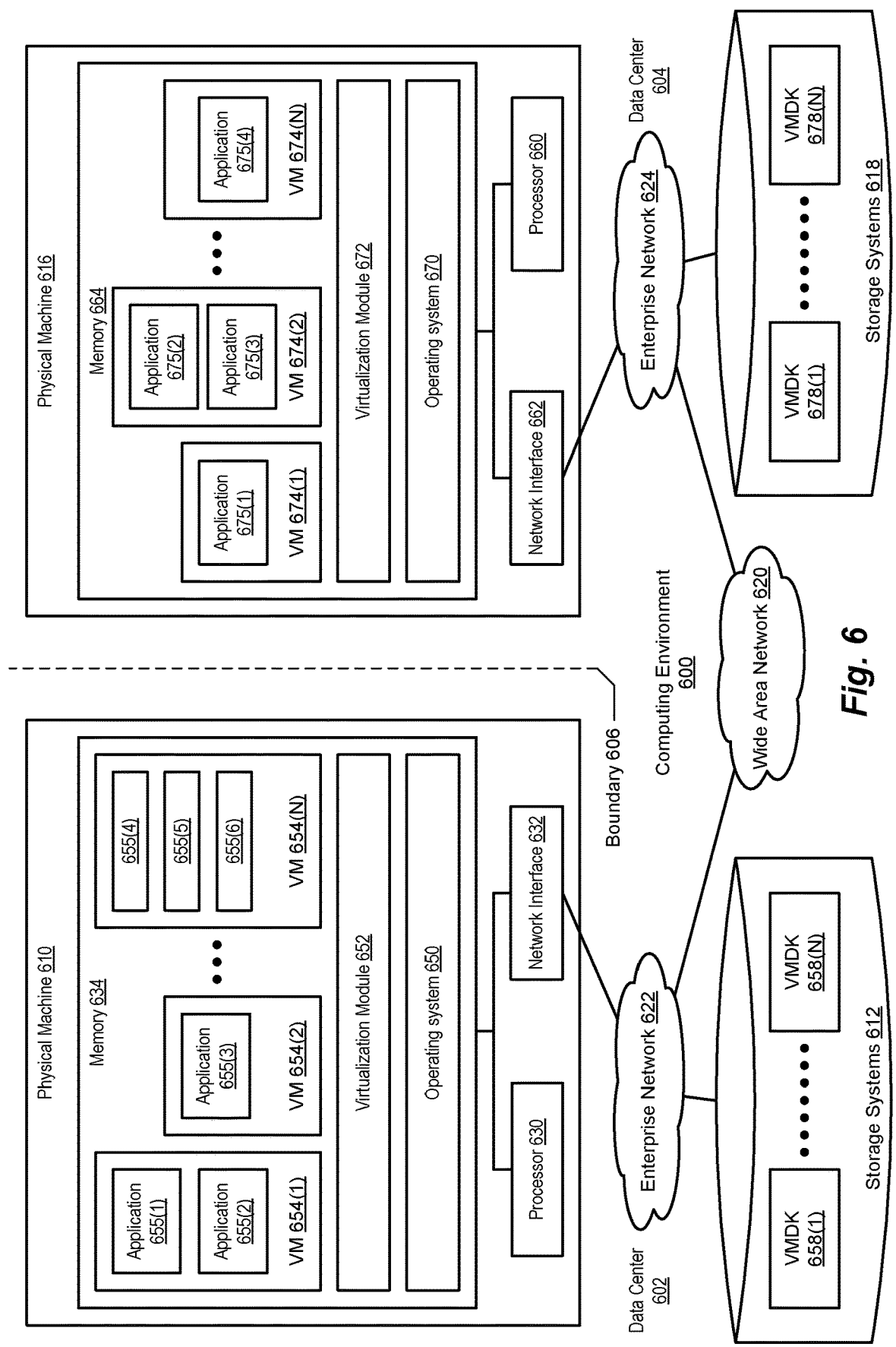
FIG. 6 is a block diagram illustrating an example of hardware and software entities in a computing environment, according to one embodiment.

FIG. 6 is a block diagram illustrating an example of hardware and software entities in a computing environment, according to one embodiment. As depicted, a computing environment of FIG. 6 includes a data center 602 and a data center 604, separated by a boundary 606. As noted earlier, a boundary such as boundary 606 can result from logical separations between data center 602 and 604, physical separation, and other such circumstances. As will be appreciated, separation represented by boundary 606 is typically intentional, as the result of disaster recovery planning and the like. Data center 602 includes, for example, a physical machine 610 and storage systems 612. Similarly, data center 604 is depicted as including a physical machine 616 and storage systems 618. Data centers 602 and 604 are communicatively coupled to one another by a wide area network 620. Entities within data center 602 are able to communicate with one another via an enterprise network 622, which is, in turn, coupled to wide area network 620. In comparable fashion, data center 604 includes an enterprise network 624, which couples the entities of data center 604 (e.g., physical machine 616 and storage systems 618) to one another. Data center 604 is also communicatively coupled to wide area network 620 by enterprise network 624.

The physical machines depicted in FIG. 6 (physical machines 610 and 616) support a variety of hardware and software units. For example, physical machine 610 includes a processor 630, a network interface 632, and a memory 634. As depicted in FIG. 6, various software modules are stored in memory 634 (and are executed therefrom). Such software modules can include, for example, an operating system 650, a virtualization module 652, and one or more virtual machines (depicted in FIG. 6 as virtual machines (VMs) 654(1)-(N)). Virtualization module 652 can be implemented, for example, as a hypervisor or comparable construct, in support of virtual machines 654(1)-(N) in turn, virtual machines 654(1)-(N) support the execution of one or more applications (depicted in FIG. 6 as applications 655(1)-(6)). Storage systems 612 include virtual machine disks (VMDK) 658(1)-(N), which provide storage for one or more associated virtual machines (e.g., virtual machine 654 (1)-(N)).

In comparable fashion, physical machine 616 provides components such as a processor 660, a network interface 662, and a memory 664. In the manner of memory 634, memory 664 stores and permits execution of software modules such as operating system 670, virtualization module 672, and some number of virtual machines (depicted in FIG. 6 as virtual machines 674(1)-(N)). In turn, virtual machines 674(1)-(N) can support some number of applications (depicted in FIG. 6 as applications 675(1)-(4)). Storage systems 618 include virtual machine disks (VMDK) 678(1)-(N), which provide storage for one or more associated virtual machines (e.g., virtual machine 654 (1)-(N)).

Figure 7:
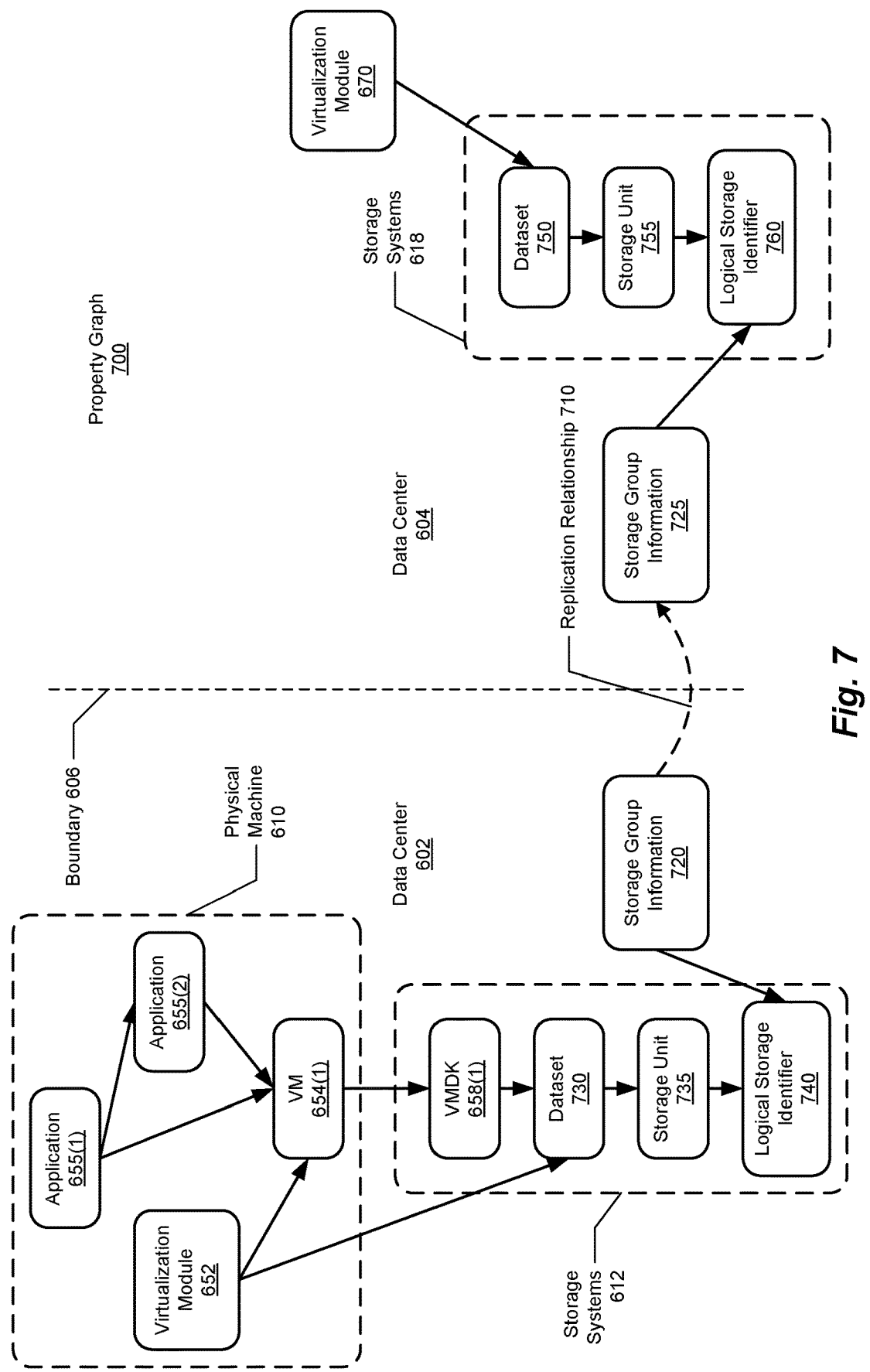
FIG. 7 is a block diagram illustrating an example of a representation of a property graph representing portions of the computing environment of FIG. 6, according to one embodiment.

FIG. 7 is a block diagram illustrating an example of a representation of a property graph representing portions of the computing environment of FIG. 6, according to one embodiment. In FIG. 7, a computing environment such as computing environment 600 of FIG. 6 is represented by a property graph 700 (or similar construct). As before, data center 602 and data center 604 are separated by boundary 606. In property graph 700, entities in data center 602 and data center 604, as depicted in FIG. 7, have relationships with one another via a replication relationship 710 between a storage information group 720 and a storage information group 725. As can be seen, these and other entities, while not shown in FIG. 6, exist either physically or logically, and so are subject to representation in property graph 700. In the manner noted, property graph 700 also represents relationships between entities which do appear in FIG. 6. For example, application 655(1) depends on application 655(2). Applications 655(1) and 655(2), in turn, depend on virtual machine 654(1). Virtual machine 654(1) depends on virtualization module 652 and also on one of the virtual machine disks (virtual machine disk 658(1)). Applications 655(1) and 655(2) also depend on a dataset 730, which is stored on a storage unit 735 that is identified by a logical storage identifier 740, which all exist in storage systems 612. The storage unit of storage systems 612 (e.g., storage unit 735, identified by logical storage identifier 740) are identified as being members of a storage group by storage group information 720, which results in the replication relationship (replication relationship 710) with storage in data center 604 via storage group information 725 therein. In a manner similar to that of data center 602, data center 604 provides support for replication relationship 710 by including, for example, a dataset 750 that is stored in a storage unit 755 identified by a logical storage identifier 760, within storage systems 618.

Example Processes for the Creation and Analysis of Representational Constructs

Figure 8:
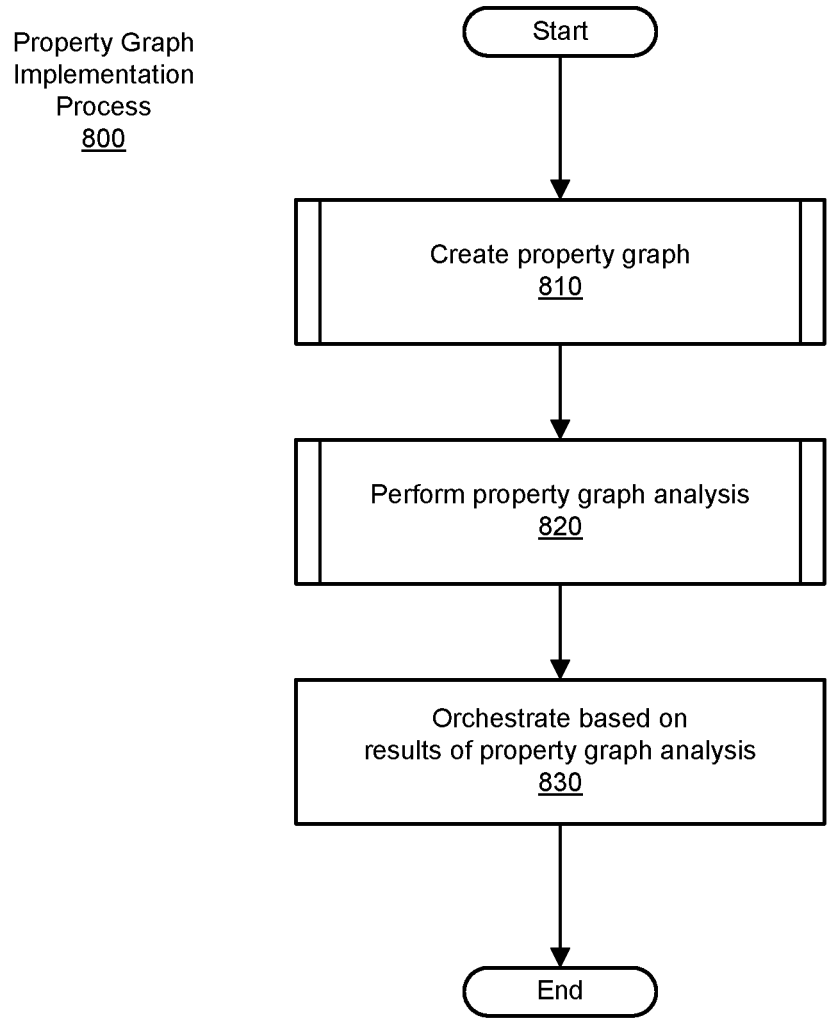
FIG. 8 is a flowchart depicting an example process for the implementation of a property graph, according to one embodiment.

FIG. 8 is a flowchart depicting an example process for the implementation of a property graph, according to one embodiment. FIG. 8 depicts a property graph implementation process 800. Property graph implementation process 800 begins with the creation of a property graph at 810. Once the requisite property graph(s) have been created, analysis of the hardware and software components represented thereby can be performed. Property graph analysis is therefore performed at step 820. The hardware and software components of the computing environment in question having been analyzed using methods and systems such as those described therein, orchestration of those hardware and software components can now be performed. Orchestration based on one or more results of the property graph analysis thus performed is then accomplished at step 830.

Figure 9:
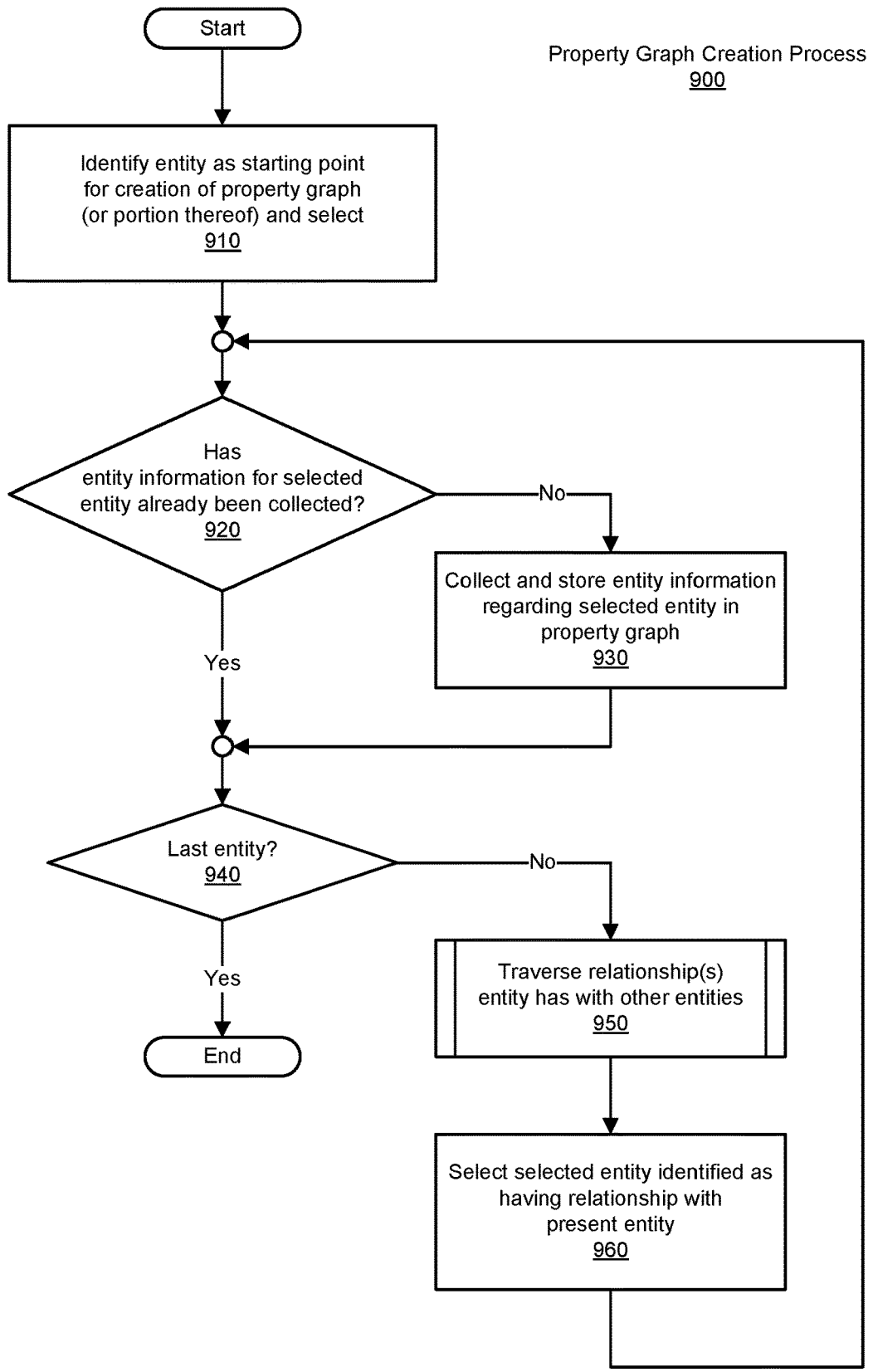
FIG. 9 is a flowchart depicting an example process for property graph creation, according to one embodiment.

FIG. 9 is a flowchart depicting an example process for property graph creation, according to one embodiment. The creation of a property graph (or one or more property graphs) can be accomplished by way of a property graph creation process 900, as depicted in FIG. 9. Property graph creation process 900 begins with the identification of the entity (hardware and/or software components within, for example, a data center) as a starting point for the creation of the property graph (or a portion thereof) and that it being selected at 910. For the selected entity, a determination is made as to whether the selected entity has already had its entity information collected (920). If the selected entity's entity information has not yet been collected, the entity information for the selected entity is collected and stored in association with the node in the property graph representing the selected entity (930). Once the requisite entity information has been collected and stored (or a determination made that such collection and storage has already been performed, and thus is not necessary), a determination is made as to whether the selected entity is the last entity needing creation of a node in the property graph (940). If the selected node was indeed the last entity, the process concludes.

Alternatively, if additional entities remain, the management software traverses relationships that the selected entity may have with other entities in order to add these entities to the property graph (950). An example of a process for traversing such relationship is described in connection with the process depicted in FIG. 10, below. The management system having traversed from the selected entity to the next entity, the next entity is selected as the next selected entity for analysis (960). The process then returns to the determination as to whether entity information has already been collected for the (now) selected entity (920). This process continues, until such time as entity information for the entities in question has been collected and stored in association with those entities in the property graph.

Figure 10:
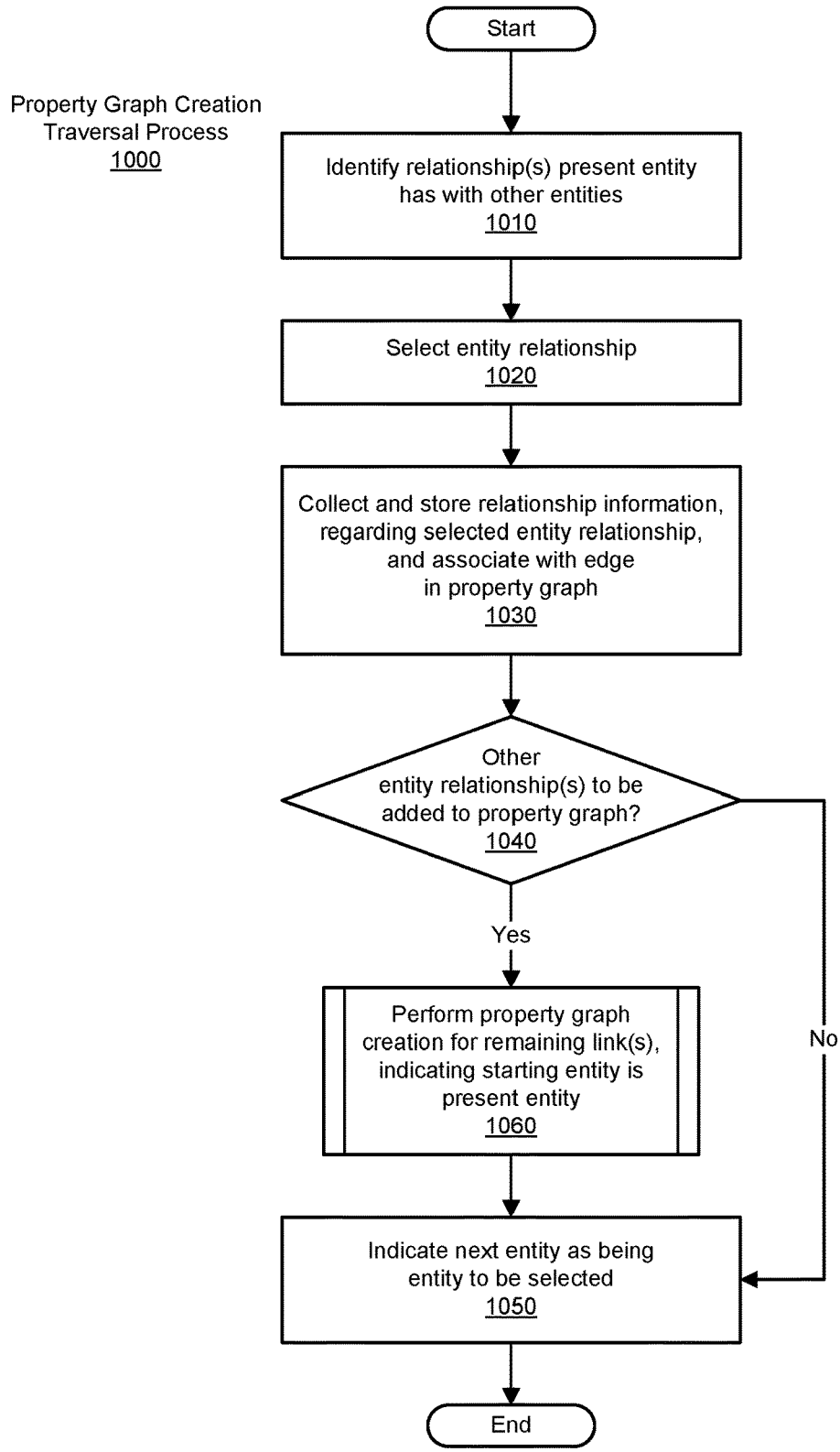
FIG. 10 is a flowchart depicting an example process for traversing entities and their relationships, according to one embodiment, in order to create a property graph according to one embodiment.

FIG. 10 is a flowchart depicting an example process for traversing entities and their relationships, according to one embodiment, in order to create a property graph according to one embodiment. As noted, the management software will traverse hardware and software components and their relationships, in order to build a construct (e.g., a property graph) that represents such component and their relationships therein. To this end, the management process will traverse such components by way of their relationships, as is depicted in FIG. 10 by a property graph creation traversal process 1000. Property graph creation traversal process 1000 begins with the identification of one or more relationships that the present entity has with other entities (i.e., that the component in question has with other components within the given data center or other data centers) (1010). Next, one of these entity relationships is selected (1020). Relationship information regarding the selected entity relationship (i.e., the relationship between the components in question) are then collected and stored in association with the edge of the property graph representing this relationship (1030). A determination is then made as to whether other entity relationships between the present entity (component) and other such entities (components) remain to be added to the property graph (1040). If no further relationships exist, and so require creation, the process proceeds to a point of which the next entity with which the present entity has a relationship is to be selected (1050). The process then concludes. Alternatively, in the case in which additional entity relationships remain to be added to the property graph (1040), property graph creation traversal process 1000 proceeds to the performance of the property graph creation process depicted in FIG. 9 (property graph creation process 900) to allow for the creation of the requisite link (SM) representing the remaining entity relationship (S), with an indication as to the starting entity being the presently-selected entity (1060). In so doing, and as will be appreciated in light of the present disclosure, the process of creating one or more remaining links in property graph creation traversal process 1000 (and so property graph creation process 900) is recursive in nature, and so explore the components and their relationships in a manner that provides for the creation of a graph according to the methods and systems such as those described herein. Thus, as multiple relationships that a given component may have with other components, edges (links) can be created in the resulting property graph and so provide an accurate representation of the components and their relationship in a computing environment.

Figure 11:
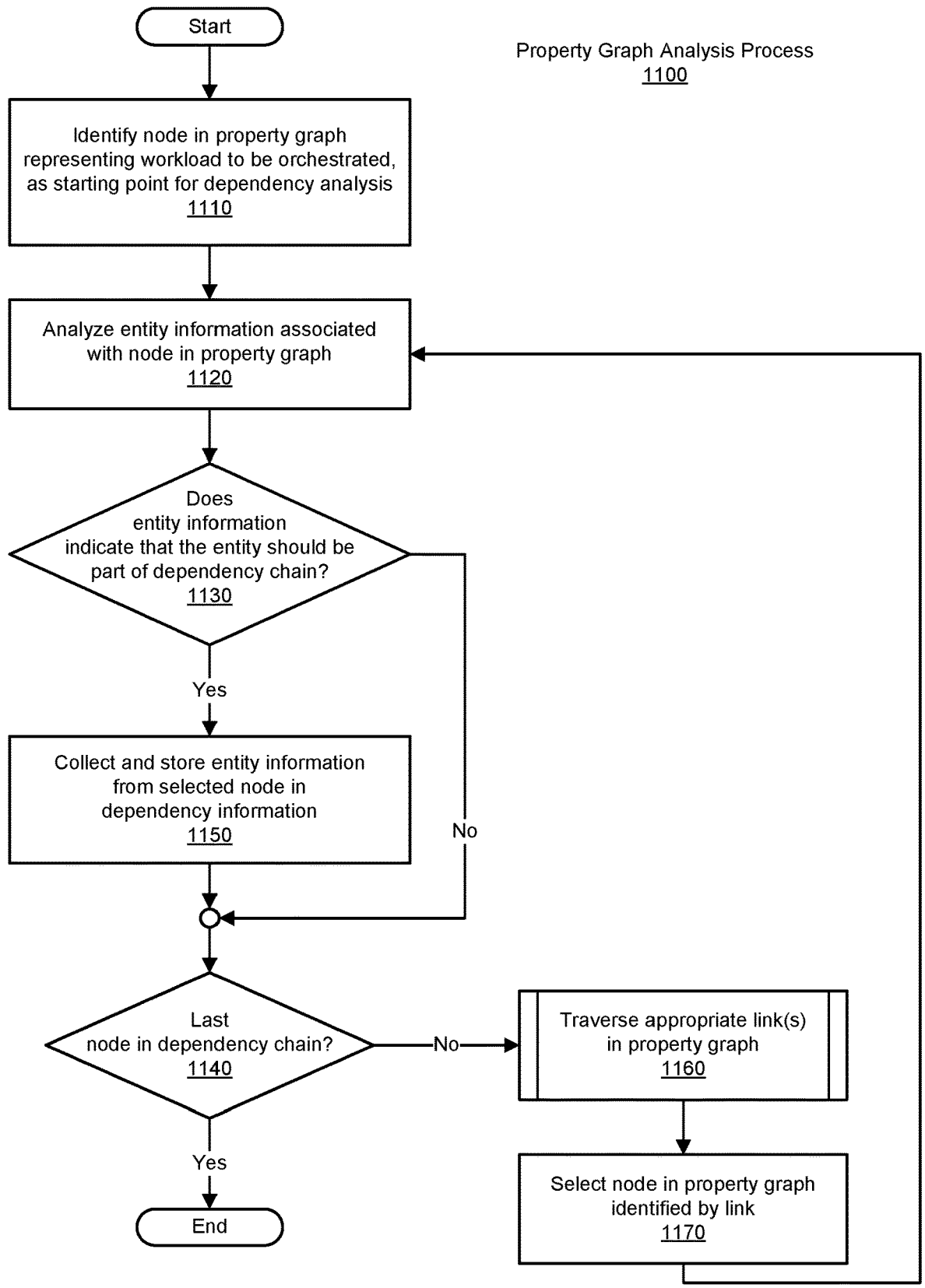
FIG. 11 is a flowchart depicting an example process for analyzing one or more property graphs, according to one embodiment.

FIG. 11 is a flowchart depicting an example process for analyzing one or more property graphs, according to one embodiment. Property graph analysis can thus be performed by, for example, a property graph analysis process 1100. Property graph analysis process 1100 begins with the identification of a node in the given property graph that represents the workload to be orchestrated (1110). In so doing, property graph analysis process 1100 identifies this node as the starting point for a dependency analysis. Next, entity information associated with the node in the property graph is analyzed (1120). A determination has been made as to whether the entity information associated with the selected node indicates that the entity (node) should be part of the dependency chain being generated (1130). If the entity information indicates that the entity need not be made part of the dependency chain, a determination is made as to whether the selected node is the last such node to be analyzed for the given dependency chain (1140). If the node in question is the last such node, the process concludes. Alternatively, if the entity information indicates that the node should be included in the dependency chain such entity information is collected and stored in the dependency information being recorded (1150). As before, a determination is then made as to whether the selected node is the last node in the dependency chain (1140). If the selected node is the last node in the dependency chain, the process concludes. Alternatively, if further nodes remain to be analyzed, the process proceeds to a traversal of the appropriate link(s) and the property graph to reach a next node(s) to potentially be included in the dependency chain (1160). An example of the operation that can be performed in traversing to the next node are discussed in detail in connection with FIG. 12, below. Having traversed to the next node in the property graph to be analyzed, property graph analysis process 1100 selects the node in question, and proceeds to its analysis (1170). The process thus loops to the analysis of this selected node (1120), and the process of property graph analysis process 1100 continues.

Figure 12:
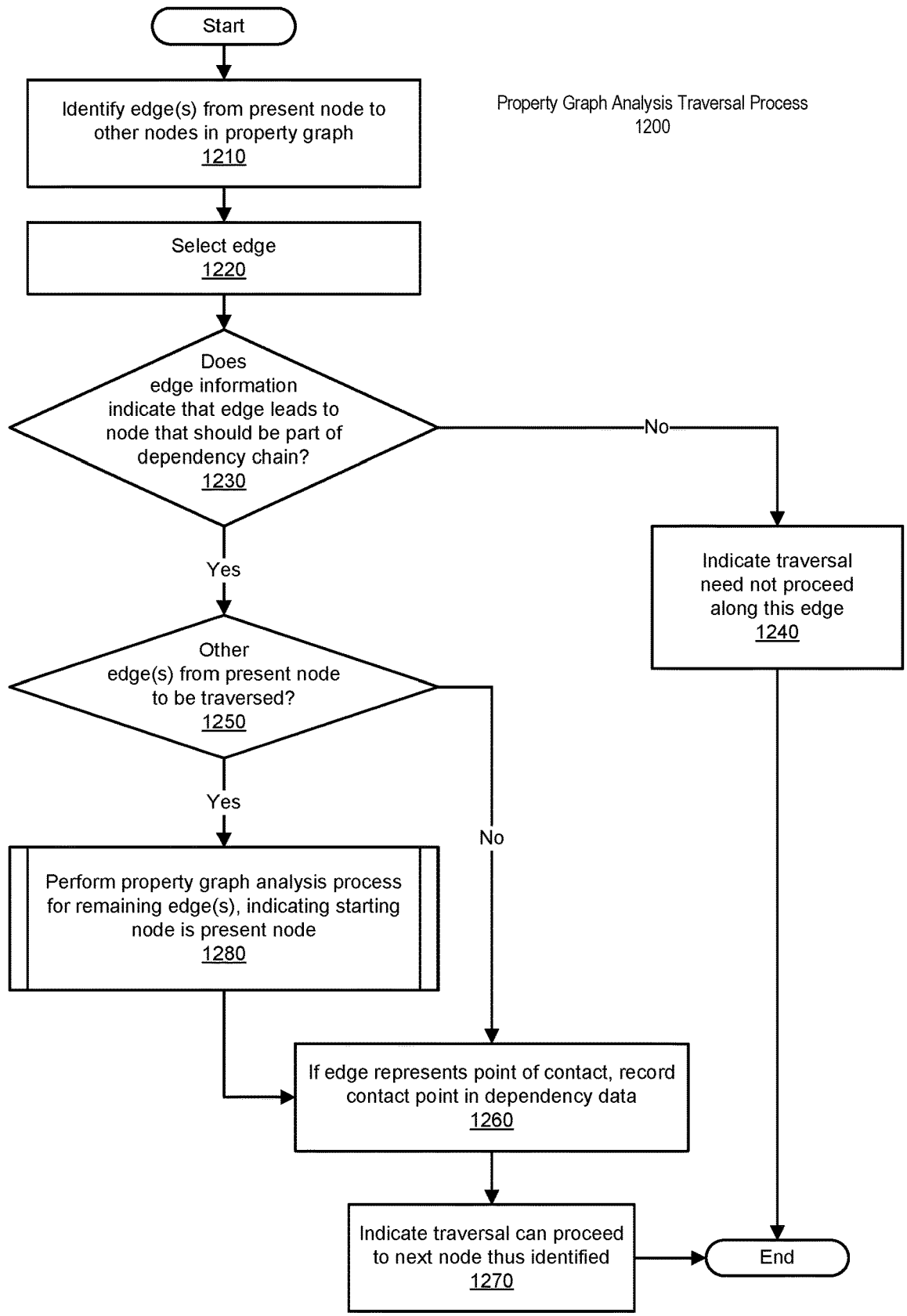
FIG. 12 is a flowchart depicting an example process for traversing a property graph as part of analyzing the property graph, according to one embodiment.

FIG. 12 is a flowchart depicting an example process for traversing a property graph as part of analyzing the property graph, according to one embodiment. A property graph analysis traversal process 1200 is thus depicted, and begins with the identification of one or more edges from the present node in the property graph to other nodes in the property graph (1210). At this point, property graph analysis traversal process 1200 selects an edge from the present node representing that entity's relationship with another entity represented in the property graph (1220). A determination is then made as to whether edge information related to the edge (relationship) indicates that the edge leads to one or more nodes that will be included in the dependency chain (1230). If the given edge does not lead to such nodes (and so it can be concluded that no further analysis along this path through the property graph is needed), an indication is made that traversal along such a path need not proceed (1240). The process then concludes. Alternatively, if the edge information in question indicates that the edge leads to one or more nodes that should be part of the dependency chain, a determination is made as to whether other edges from the present node in the property graph will need to be traversed (1250). If no other edges from the present node need be traversed, a determination is made as to whether the edge represents a point of contact (contact point), and if so, contact point information is recorded in the dependency data (1260). An indication is then made that traversal can proceed to the next node thus identified (1270). The process then concludes.

Alternatively, if other edges from the present node in the property graph remain to be traversed (1250), property graph analysis traversal process 1200 performs property graph analysis (property graph analysis traversal process 1100) for the remaining edges, indicating that the starting node for such analyses is the present node (1280). In a manner similar to that discussed earlier, it will be appreciated that this process is recursive in nature, and so traverses the property graphing question in a manner that ensures that all requisite nodes (and so, entities) are included in the ordered dependency information that can be used by orchestration software to perform management tasks such as disaster recovery. As before, if the present edge represents a contact point, information regarding this contact point is recorded in the dependency data, for use by the orchestration software (1260). Also as before, an indication is then made that traversal of the property graph in question can proceed to the next node thus identified (1270). The process then concludes.

Examples of Representational Constructs

Figure 13:
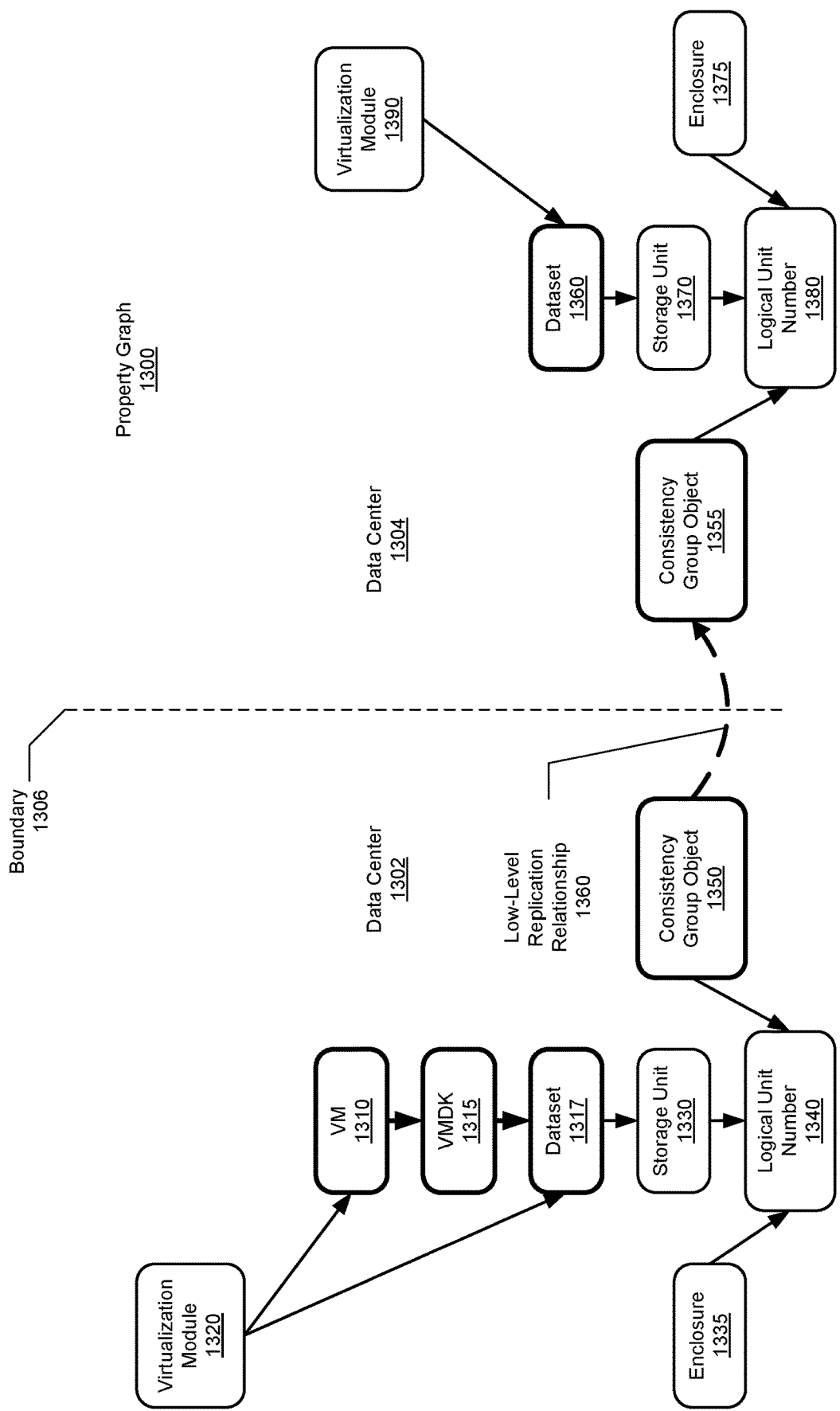
FIG. 13 is a block diagram illustrating an example of a representation of a property graph, according to one embodiment, in which low-level replication is implemented.

FIG. 13 is a block diagram illustrating an example of a representation of a property graph, according to one embodiment, in which low-level replication is implemented. In the example of FIG. 13, a virtual machine is protected with LUN-level replication (the virtual machine is protected because it is resident on a data store which is on a LUN replicated at the storage array level). A property graph 1300 is thus depicted in FIG. 13, and, as before, includes representations of entities in a data center 1302 and a data center 1304, which are separated by a boundary 1306. Components in data center 1302 represented by the entities (nodes) depicted in FIG. 13 include a virtual machine 1310, a virtual machine disk 1315, and a dataset 1317. Virtual machine 1310, virtual machine disk 1315, and dataset 1317 are supported by a virtualization module 1320. Dataset 1317 is stored on a storage unit 1330 in an enclosure 1335. Storage unit 1330 is identified by a logical unit number 1340. Information stored in storage unit 1330 is replicated between a consistency group object 1350 in data center 1302 and a consistency group object 1355 in data center 1304. Replication operations are represented by a low-level replication relationship 1360. Replication of dataset 1317 is performed, and thus the data in dataset 1317 is replicated to a dataset 1316 that is stored in a storage unit 1370 within an enclosure 1375, and identified by a logical unit number 1380. Dataset 1360 is supported by a virtualization module 1390.

As is depicted in FIG. 13, various entities represented by the nodes of property graph 1300 can be migrated (e.g., in the case of disaster recovery), and it is the identification of the entity and the determination of certain other characteristics that enable an orchestration system to perform such migration. That being the case, elements depicted in FIG. 13 with heavier line weights represent entities and their relationships identified during a property graph analysis process such as property graph analysis process 1100 of FIG. 11. For example, VM 1310 is seen to have a relationship with VMDK 1315, which has a relationship to dataset 1317. Storage unit 1330 and enclosure 1335 (as well as the identifier of storage unit 1330 (logical unit number 1340)) are not appropriate candidates for migration, and so are not shown in heavier line widths. Consistency group objects 1350 and 1355, which are associated with one another by low-level replication relationship 1360, allow such a property graph analysis process to make a determination with regard to entities in data center 1304. That being the case, such a process identifies dataset 1360 as also (potentially) being subject to migration. In this example, storage unit 1370 (identified by logical unit number 1380) and enclosure 1375, as well as virtualization module 1390, are deemed inappropriate for migration.

By traversing the entities depicted in FIG. 13, information for use in a property graph can be assembled:

```
DC1 {
    Ecosystems: {
        Compute: [
            {Tech: vmware, Objects: {VM1}}
        ],
        Storage: [
            {Tech: vmware, Objects: {vmdk1, DS1}}
        ],
        Replication: [
            {Tech: srdf, Objects: {CG1}}
        ]
    }
},
DC2 {
    Ecosystems: {
        Replication: [
            {Tech: srdf, Objects: {CG2}}
        ],
        Storage: [
            {Tech: vmware, Objects: {DS2}}
        ],
    }
}
```

Figure 14:
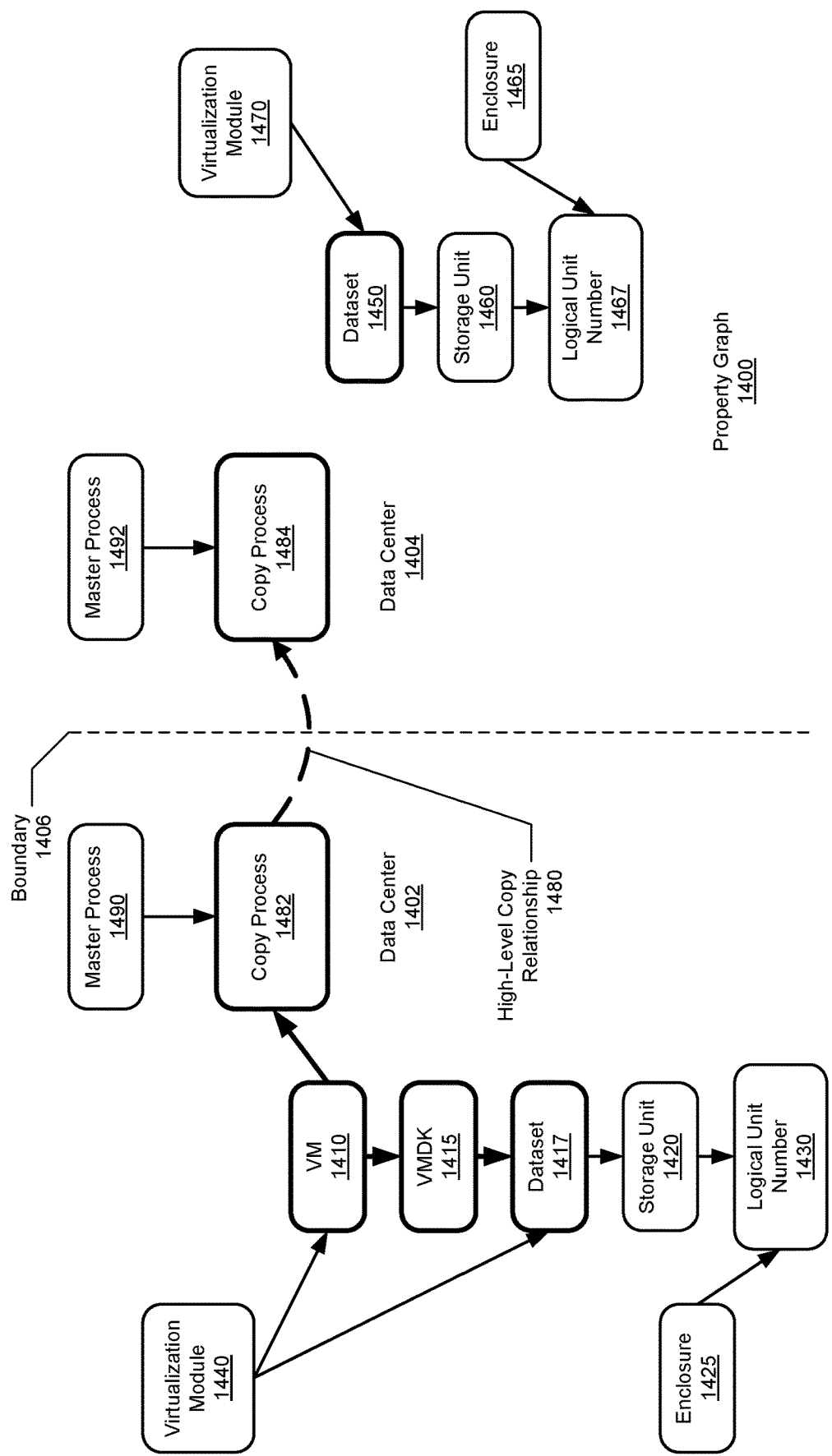
FIG. 14 is a block diagram illustrating an example of a representation of a property graph, according to one embodiment, in which high-level copying is implemented.

FIG. 14 is a block diagram illustrating an example of a representation of a property graph, according to one embodiment, in which high-level copying is implemented. In the example depicted in FIG. 14, a virtual machine is protected using an out-of-band replication technique. A property graph 1400 is thus depicted in FIG. 14, and again includes common elements such as a data center 1402, a data center 1404, and a boundary therebetween (depicted in FIG. 14 as a boundary 1406). In the scenario depicted in FIG. 14, a VM 1410, a VMDK 1415, and dataset 1417 are depicted in relation to one another, as is a storage unit 1420 in an enclosure 1425 and identified by a logical unit number 1430. As before, a virtualization module 1440 supports VM 1410 and dataset 1417 stored in VMDK 1415 within storage unit 1420. A copy of dataset 1417 exists in data center 1404 as a data set 1450 stored in a storage unit 1460 in an enclosure 1465 and identified by a logical unit number 1467, and supported by a virtualization module 1470. Dataset 1450 is a copy of dataset 1470 and is created by a high-level copy relationship 1480 between a copy process 1482 and a copy process 1484. Copy process 1482 is under the control of a master process 1490, while copy process 1484 is under the control of a master process 1492. As in the example presented in FIG. 13, the example depicted in FIG. 14 employs heaving line widths to denote nodes in property graph 1400 that, in the given example, are subject to orchestration. That being the case, VM 1410, VMDK 1415, and dataset 1417 in data center 1402 are subject to such orchestration. By traversing property graph 1400, however, a determination can be made that dataset 1450 is also subject to such orchestration. As will be appreciated in light of the present disclosure, the migration may include all of these entities, or some portion thereof. For example, the entities subject orchestration that are in data center 1402 might be migrated to another data center while maintaining the relationship with entities within data center 1404 (e.g., dataset 1450) in, for example, a disaster recovery scenario.

By traversing the entities depicted in FIG. 14, information for use in a property graph can be assembled:

```
DC1 {
    Ecosystems: {
        Compute: [
            {Tech: vmware, Objects: {VM1}}
        ],
        Copy: [
            {Tech: nbu, Objects: {vm1copy}}
        ]
    }
},
DC2 {
    Ecosystems: {
        copy [
            {Tech: nbu, Objects: {vm1copy}}
        ]
    }
}
```

Figure 15:
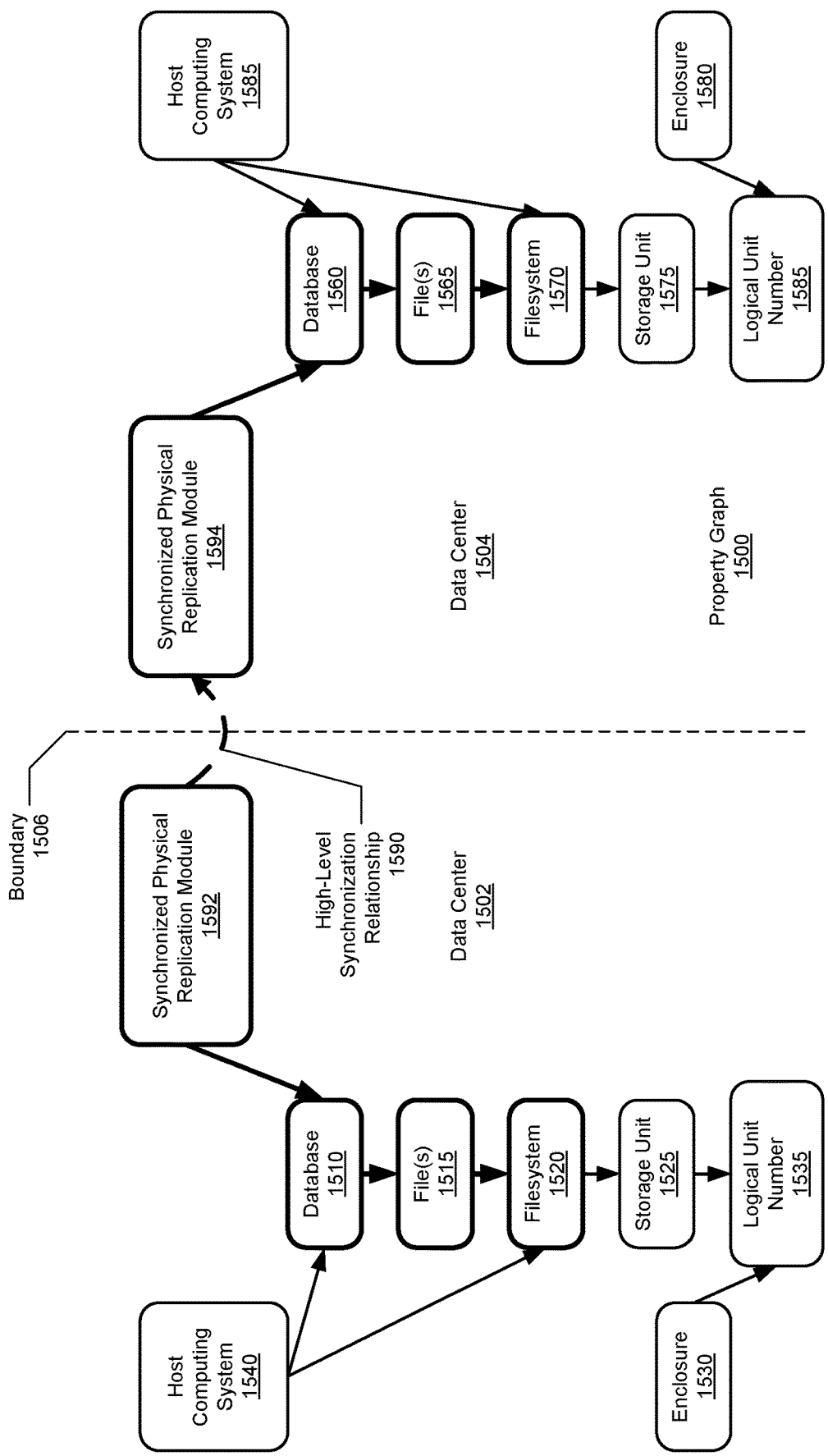
FIG. 15 is a block diagram illustrating an example of a representation of a property graph, according to one embodiment, in which high-level synchronized physical replication is implemented.

FIG. 15 is a block diagram illustrating an example of a representation of a property graph, according to one embodiment, in which high-level synchronized physical replication is implemented. FIG. 15 thus depicts a property graph 1500 that includes a data center 1502 and data center 1504 separated by a boundary 1506. In the scenario presented in FIG. 15, data center 1502 supports a database 1510 that comprises one or more file(s) 1515 that are stored in a file system 1520 on a storage unit 1525 in an enclosure 1530 and identified by a logical unit number 1535. Database 1510 and its file(s) 1515 in filesystem 1520 are supported by a host computing system 1540. Database 1510 is replicated to data center 1504 and appears in data center 1504 as a database 1560 that includes one or more file(s) 1565 in a filesystem 1570 on a storage unit 1575 in an enclosure 1580 and identified by a logical unit number 1585. In a fashion similar to data center 1502, data center 1504 supports database 1560, file(s) 1565, and filesystem 1570 on one or more host computing systems (depicted in FIG. 15 as a host computing system 1585 to affect a synchronization relationship (depicted in FIG. 15 as a high-level synchronization relationship 1590), components in data centers 1502 and 1504 include a synchronized physical replication module 1592 and a synchronized physical replication module 1594. Synchronized physical replication modules 1592 and 1594 support high-level synchronization relationship 1590, which is represented in property graph 1500 and can be analyzed by a property graph analysis process such as property graph analysis process 1100 of FIG. 11. To that end, entities depicted in FIG. 15 in heavier line widths are those subject to such property graph analysis, and thus appear in orchestration information that can be used by an orchestration system to perform, for example, migration of such entities (e.g., in the event of a disaster recovery scenario). Thus, database 1510, its file(s) (file(s) 1515), and filesystem 1520 can be migrated to another data center to facilitate recovery from a disaster. In such a case, the migration of these entities can be performed while maintaining high-level synchronization relationship 1590 by either migrating synchronized physical replication module 1592 or properly configuring such a module in the new data center.

By traversing the entities depicted in FIG. 13, information for use in a property graph can be assembled:

```
DC1 {
    Ecosystems: {
        App: [
            {Tech: oracle, Objects: {Oradb1}}
        ],
        Replication: [
            {Tech: dataguard, Objects: {DGuard2}}
        ]
    }
},
DC2 {
    Ecosystems: {
        Replication: [
            {Tech: dataguard, Objects: {DGuard2}}
        ],
        App: [
            {Tech: oracle, Objects: {Oradb2}}
        ],
    }
}
```

Example Orchestration Architecture Using Representational Constructs

Figure 16:
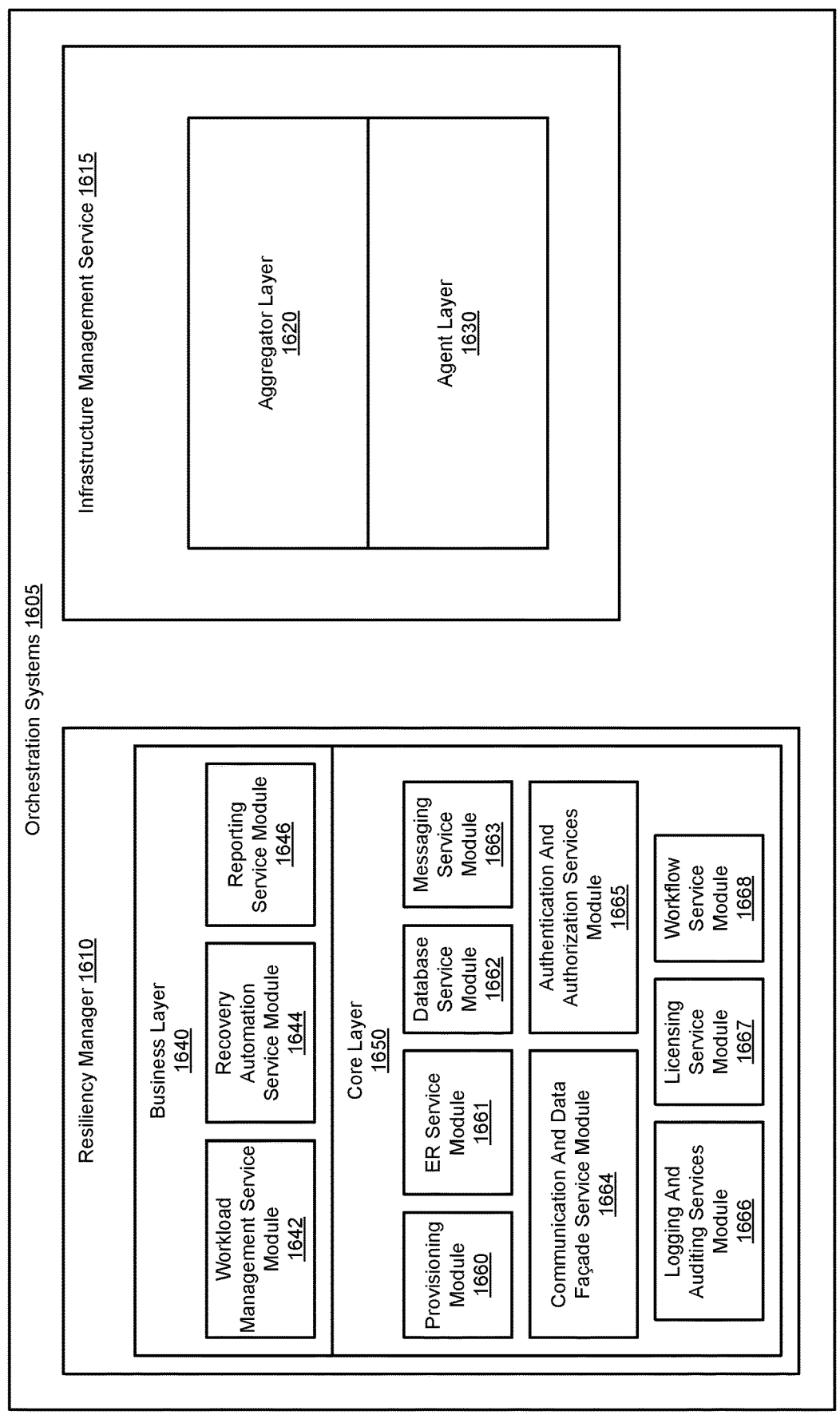
FIG. 16 is a block diagram of an example of an orchestration architecture, according to one embodiment.

FIG. 16 is a block diagram of a management and orchestration architecture according to methods and systems such as those described herein. As noted, an ITRP architecture such as that illustrated in FIG. 16 (and depicted therein as an ITRP architecture 1600) can be implemented as a centralized architecture (e.g., as depicted in FIG. 1 (ITRP server 120 and the modules thereof)), as a distributed architecture (e.g., as noted with many of the features of such an architecture such as those described herein), or as some combination thereof. That being the case, the depiction of ITRP architecture 1600 in FIG. 16 is a logical representation of the elements illustrated therein, the implementation of which can be distributed in any fashion suitable for the situation at hand.

As can be seen in FIG. 16, ITRP architecture 1600 includes ITRP systems 1605, which, in turn, include a resiliency manager 1610 and an infrastructure management service 1615. Infrastructure management service 1615, according to methods and systems such as those described herein, provides a distributed management functionality, which, in certain embodiments, can also include a two-layered set of services. Infrastructure management service 1615, in turn, includes one or more layers. As depicted in FIG. 16, infrastructure management service 1615 includes two layers, illustrated as an aggregator layer 1620 and an agent layer 1630. In light of the present disclosure, however, it will be appreciated that infrastructure management service 1615 can be configured with more than two layers, and any number of such layers can be implemented, as may be appropriate to the circumstances encountered.

Aggregator layer 1620 functions as a "top" layer, and provides the ability to provide consolidated summary of discovered assets, uniform operational layer and a persistent state for supported hardware and software elements. Agent layer 1630, in support thereof, functions as a "bottom" layer, and provides the ability to discover, monitor and operate on supported hardware elements (example—a storage array) and software elements (example—a database (DB) and/or database management system (DBMS) instance(s)).

As noted above, infrastructure management service 1615 also includes resiliency manager 1610. Resiliency manager 1610 can be configured to provide a centralized management functionality, which, in certain embodiments, includes a two-layered set of services. As with infrastructure management service 1615, however, resiliency manager 1610 can be configured with more than two layers, and any number of such layers can be implemented, as may be appropriate to the circumstances encountered. As depicted in FIG. 16, resiliency manager 1610 includes a business layer 1640. Business layer 1640 functions as a "top" layer, and, in turn, can include a number of modules, examples of which are depicted in FIG. 16 as a workload management service module 1642, a recovery automation service module 1644, and a reporting service module 1646.

Resiliency manager 1610 also includes a core layer 1650. Core layer 1650, in support of business layer 1640, functions as a "bottom" layer, and provides a number of services, by way of including modules such as, for example, a provisioning module 1660, an ER service module 1661, a database (DB) service module 1662, a messaging service module 1663, a communication and data façade service module 1664, an authentication and authorization services module 1665, a logging and auditing services module 1666, a licensing service module 1667, and a workflow service module 1668. As will be appreciated in light of the present disclosure, such modules (and the services they provide) are merely examples thereof, and are among many other such functions and services that might be provided in support of business layer 1640.

An Example Computing and Network Environment

As shown above, the systems described herein can be implemented using a variety of computer systems and networks. Examples of such computing and network environments are described below with reference to FIGS. 17 and 18.

Figure 17:
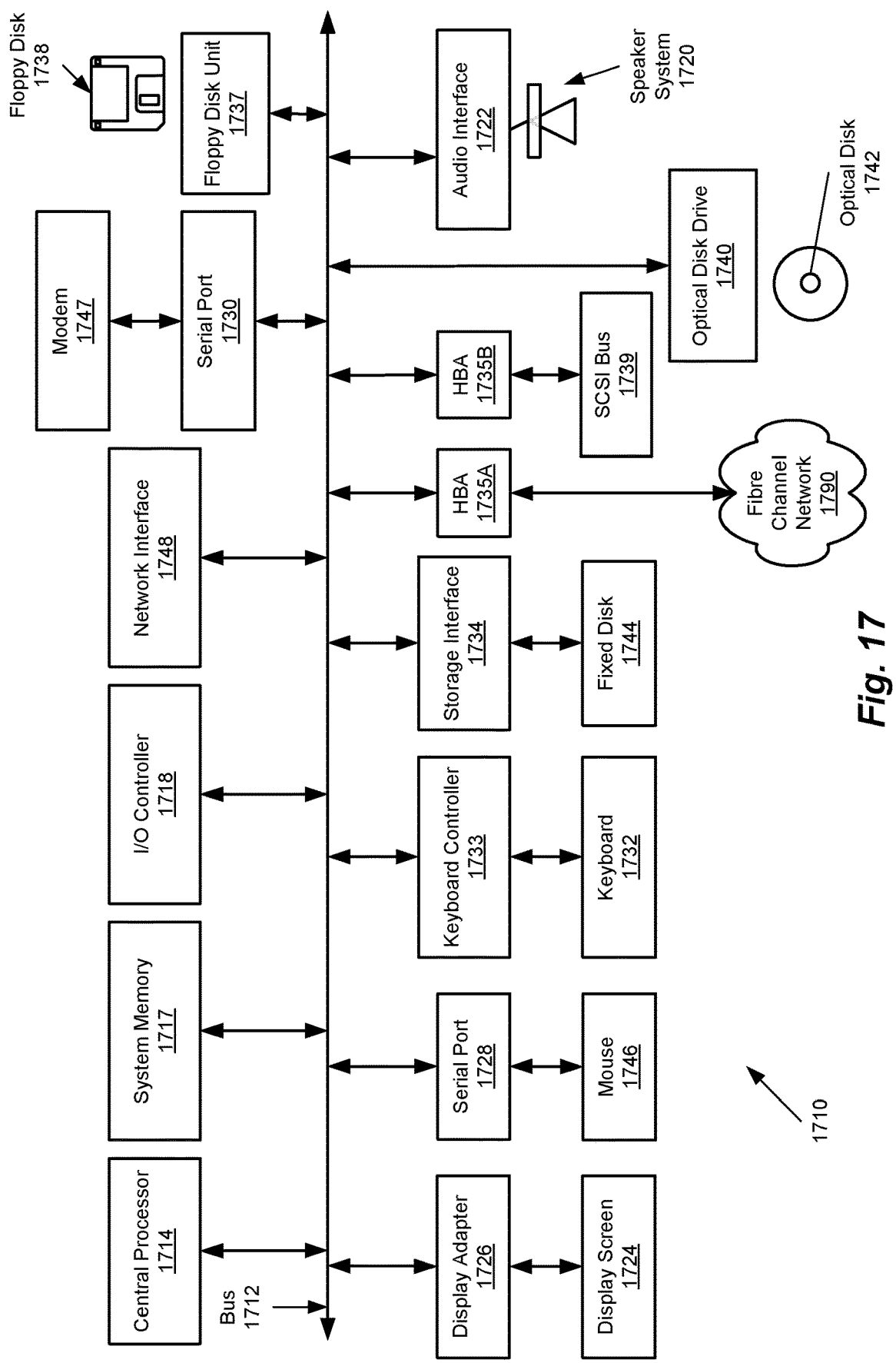
FIG. 17 is a block diagram depicting a computer system suitable for implementing aspects of systems according to embodiments of systems such as those disclosed herein.

FIG. 17 depicts a block diagram of a computer system 1710 suitable for implementing aspects of the systems described herein, and the like. Computer system 1710 includes a bus 1712 which interconnects major subsystems of computer system 1710, such as a central processor 1714, a system memory 1717 (typically RAM, but which may also include ROM, flash RAM, or the like), an input/output controller 1718, an external audio device, such as a speaker system 1720 via an audio output interface 1722, an external device, such as a display screen 1724 via display adapter 1726, serial ports 1722 and 1730, a keyboard 1732 (interfaced with a keyboard controller 1733), a storage interface 1734, a floppy disk drive 1737 operative to receive a floppy disk 1738, a host bus adapter (HBA) interface card 1735A operative to connect with a Fibre Channel network 1790, a host bus adapter (HBA) interface card 1735B operative to connect to a SCSI bus 1739, and an optical disk drive 1740 operative to receive an optical disk 1742. Also included are a mouse 1746 (or other point-and-click device, coupled to bus 1712 via serial port 1722), a modem 1747 (coupled to bus 1712 via serial port 1730), and a network interface 1748 (coupled directly to bus 1712).

Bus 1712 allows data communication between central processor 1714 and system memory 1717, which may include read-only memory (ROM) or flash memory (neither shown), and random access memory (RAM) (not shown), as previously noted. RAM is generally the main memory into which the operating system and application programs are loaded. The ROM or flash memory can contain, among other code, the Basic Input-Output System (BIOS) which controls basic hardware operation such as the interaction with peripheral components. Applications resident with computer system 1710 are generally stored on and accessed from a computer-readable storage medium, such as a hard disk drive (e.g., fixed disk 1744), an optical drive (e.g., optical drive 1740), a floppy disk unit 1737, or other computer-readable storage medium.

Storage interface 1734, as with the other storage interfaces of computer system 1710, can connect to a standard computer-readable medium for storage and/or retrieval of information, such as a fixed disk drive 1744. Fixed disk drive 1744 may be a part of computer system 1710 or may be separate and accessed through other interface systems. Modem 1747 may provide a direct connection to a remote server via a telephone link or to the Internet via an internet service provider (ISP). Network interface 1748 may provide a direct connection to a remote server via a direct network link to the Internet via a POP (point of presence). Network interface 1748 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 17 need not be present to practice the systems described herein. The devices and subsystems can be interconnected in different ways from that shown in FIG. 17. The operation of a computer system such as that shown in FIG. 17 is readily known in the art and is not discussed in detail in this application. Code to implement the modules of the systems described herein can be stored in computer-readable storage media such as one or more of system memory 1717, fixed disk 1744, optical disk 1742, or floppy disk 1738. The operating system provided on computer system 1710 may be MS-WINDOWS®, UNIX®, Linux®, or other operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Further, and as will be appreciated in light of the present disclosure, each of the operations described herein may be executed by a module (e.g., a software module) or a portion of a module, or a computer system user. Thus, the above-described method, the operations thereof and modules therefor may be executed on a computer system configured to execute the operations of the method and/or may be executed from computer-readable storage media. The method may be embodied in a machine-readable and/or computer-readable storage medium for configuring a computer system to execute the method. Thus, the software modules may be stored within and/or transmitted to a computer system memory to configure the computer system to perform the functions of the module.

The software modules described herein may be received by a computer system, for example, from computer-readable storage media. Such computer readable storage media may be permanently, removably or remotely coupled to the computer system. Computer-readable storage media may non-exclusively include, for example, any number of the following: magnetic storage media (including disk and tape storage media); optical storage media such as compact disk media (e.g., CD ROM, CD R, etc.) and digital video disk storage media; nonvolatile memory storage memory including semiconductor-based memory units such as FLASH memory, EEPROM, EPROM, ROM or application specific integrated circuits; and volatile storage media (including registers, buffers or caches, main memory, RAM, etc.). In a UNIX-based embodiment, the software modules may be embodied in a file, which may be a device, a terminal, a local or remote file, a socket, or other such element. Other new and various types of computer-readable storage media may also be used to store the software modules discussed herein.

Many other devices or subsystems (not shown) may be connected in a similar manner (e.g., bar code readers, document scanners, digital cameras and so on). Conversely, it is not necessary for all of the devices shown in FIG. 17 to be present to practice the present invention. The devices and subsystems may be interconnected in different ways from that shown in FIG. 17. The operation of a computer system such as that shown in FIG. 17 is readily known in the art and is not discussed in detail in this application. Code to implement the present invention may be stored in computer-readable storage media such as one or more of system memory 1716, fixed disk 1744, CD-ROM 1742, or floppy disk 1738. Additionally, computer system 1710 may be any kind of computing device, and so includes personal data assistants (PDAs), network appliance, X-window terminal or other such computing device. The operating system provided on computer system 1710 may be MS-DOS®, MS-WINDOWS®, UNIX®, Linux® or other known operating system. Computer system 1710 also supports a number of Internet access tools, including, for example, an HTTPcompliant web browser having a JavaScript interpreter, such as Netscape Navigator®, Microsoft Internet Explorer® and the like.

Moreover, regarding the signals described herein, those skilled in the art will recognize that a signal may be directly transmitted from a first block to a second block, or a signal may be modified (e.g., amplified, attenuated, delayed, latched, buffered, inverted, filtered or otherwise modified) between the blocks. Although the signals of the above described embodiment are characterized as transmitted from one block to the next, other embodiments of the present invention may include modified signals in place of such directly transmitted signals as long as the informational and/or functional aspect of the signal is transmitted between blocks. To some extent, a signal input at a second block may be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Figure 18:
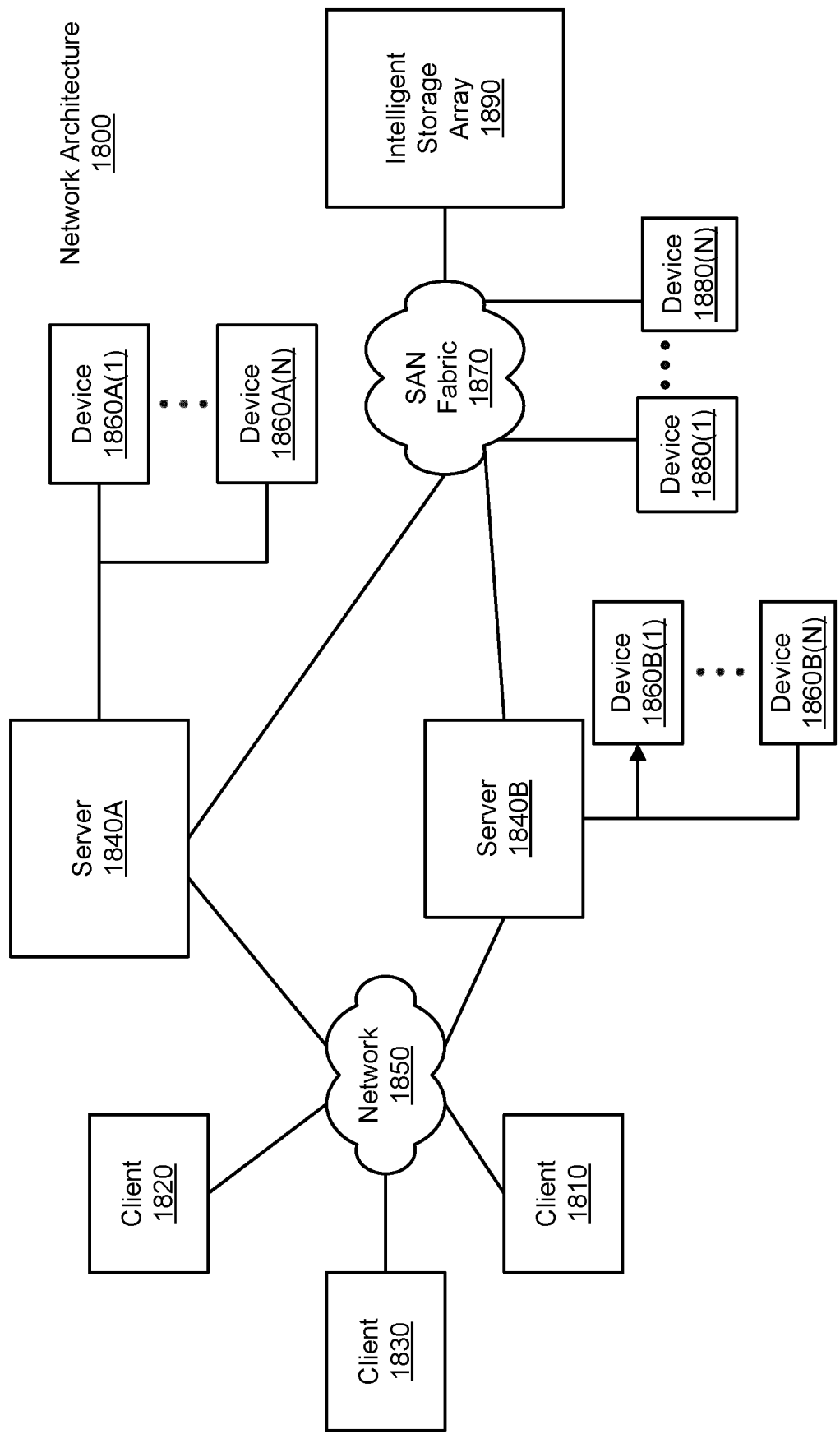
FIG. 18 is a block diagram depicting a network architecture suitable for implementing aspects of systems according to embodiments of systems such as those disclosed herein.

FIG. 18 is a block diagram depicting a network architecture 1800 in which client systems 1810, 1820 and 1830, as well as storage servers 1840A and 1840B (any of which can be implemented using computer system 1810), are coupled to a network 1850. Storage server 1840A is further depicted as having storage devices 1860A(1)-(N) directly attached, and storage server 1840B is depicted with storage devices 1860B(1)-(N) directly attached. Storage servers 1840A and 1840B are also connected to a SAN fabric 1870, although connection to a storage area network is not required for operation. SAN fabric 1870 supports access to storage devices 1820(1)-(N) by storage servers 1840A and 1840B, and so by client systems 1810, 1820 and 1830 via network 1850. Intelligent storage array 1890 is also shown as an example of a specific storage device accessible via SAN fabric 1870.

With reference to computer system 1710, modem 1747, network interface 1748 or some other method can be used to provide connectivity from each of client computer systems 1810, 1820 and 1830 to network 1850. Client systems 1810, 1820 and 1830 are able to access information on storage server 1840A or 1840B using, for example, a web browser or other client software (not shown). Such a client allows client systems 1810, 1820 and 1830 to access data hosted by storage server 1840A or 1840B or one of storage devices 1860A(1)-(N), 1860B(1)-(N), 1820(1)-(N) or intelligent storage array 1890. FIG. 18 depicts the use of a network such as the Internet for exchanging data, but the systems described herein are not limited to the Internet or any particular network-based environment.

The foregoing described embodiments wherein the different components are contained within different other components (e.g., the various elements shown as components of computer system 1710, discussed subsequently). It is to be understood that such depicted architectures are merely examples, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected", or "operably coupled", to each other to achieve the desired functionality.

OTHER EMBODIMENTS

The systems described herein are well adapted to attain the advantages mentioned as well as others inherent therein. While such systems have been depicted, described, and are defined by reference to particular descriptions, such references do not imply a limitation on the claims, and no such limitation is to be inferred. The systems described herein are capable of considerable modification, alteration, and equivalents in form and function, as will occur to those ordinarily skilled in the pertinent arts in considering the present disclosure. The depicted and described embodiments are examples only, and are in no way exhaustive of the scope of the claims.

The foregoing detailed description has set forth various embodiments of the systems described herein via the use of block diagrams, flowcharts, and examples. It will be understood by those within the art that each block diagram component, flowchart step, operation and/or component illustrated by the use of examples can be implemented (individually and/or collectively) by a wide range of hardware, software, firmware, or any combination thereof.

The systems described herein have been described in the context of fully functional computer systems; however, those skilled in the art will appreciate that the systems described herein are capable of being distributed as a program product in a variety of forms, and that the systems described herein apply equally regardless of the particular type of computer-readable media used to actually carry out the distribution. Examples of computer-readable media include computer-readable storage media, as well as media storage and distribution systems developed in the future.

The above-discussed embodiments can be implemented by software modules that perform one or more tasks associated with the embodiments. The software modules discussed herein may include script, batch, or other executable files. The software modules may be stored on a machine-readable or computer-readable storage media such as magnetic floppy disks, hard disks, semiconductor memory (e.g., RAM, ROM, and flash-type media), optical discs (e.g., CD-ROMs, CD-Rs, and DVDs), or other types of memory modules. A storage device used for storing firmware or hardware modules in accordance with an embodiment can also include a semiconductor-based memory, which may be permanently, removably or remotely coupled to a microprocessor/memory system. Thus, the modules can be stored within a computer system memory to configure the computer system to perform the functions of the module. Other new and various types of computer-readable storage media may be used to store the modules discussed herein.

The above description is intended to be illustrative and should not be taken to be limiting. As will be appreciated in light of the present disclosure, other embodiments are possible. Those skilled in the art will readily implement the steps necessary to provide the structures and the methods disclosed herein, and will understand that the process parameters and sequence of steps are given by way of example only and can be varied to achieve the desired structure as well as modifications that are within the scope of the claims. Variations and modifications of the embodiments disclosed herein can be made based on the description set forth herein, without departing from the scope of the claims, giving full cognizance to equivalents thereto in all respects.

Although the systems described herein have been described in connection with several embodiments, these embodiments and their descriptions are not intended to be limited to the specific forms set forth herein. On the contrary, it is intended that such embodiments address such alternatives, modifications, and equivalents as can be reasonably included within the scope of the appended claims.

What is claimed is:

1. A computer-implemented method comprising:
    creating a property graph having a plurality of nodes representing a plurality of entities, wherein the plurality of entities correspond to a core physical or hardware-based resources, wherein
        at least one entity of the plurality of entities is the core physical or hardware-based resource in a first data center infrastructure,
        at least another entity of the plurality of entities is a core physical or hardware-based resource in a second data center infrastructure,
        one or more nodes of the plurality of nodes is coupled to at least one other node of the plurality of nodes by one or more links of a plurality of links of the property graph, and
        each of the one or more links represents a relationship between the entities represented by the one or more nodes;
    analyzing entity information associated with the plurality of nodes, wherein the entity information is information regarding the entity, and the analyzing comprises
        determining whether at least one link of the plurality of links for a node representing the at least one entity in the first data center infrastructure crosses a boundary between the first data center infrastructure and the second data center infrastructure, by virtue of the at least one link representing a relationship between the at least one entity in the first data center infrastructure and the at least another entity in the data center infrastructure, wherein the boundary includes a boundary between the core physical or hardware-based resources in the first data center infrastructure and the core physical or hardware-based resources in the second data center infrastructure; and
    in response to a determination that the at least one link of the plurality of links crosses the boundary, storing entity information for at least one of the at least one entity and/or the at least another entity in dependency information,
    wherein the storing comprises recording a contact point in the dependency information representing a relationship between the at least one entity in the first data center infrastructure and that the at least another entity in the second data center infrastructure, the dependency information is configured to facilitate performance of an orchestration operation on one or more of the plurality of entities, and
    an orchestration operation executed on the at least one entity at the contact point results in execution of an orchestration operation on the at least another entity.

2. The method of claim 1, further comprising:
    traversing the plurality of links to identify other links of the plurality of links crossing the boundary;
    determining whether a node having a link that crosses the boundary should be included in the dependency information;
    in response to a determination that the node having a link that crosses the boundary should be included in the dependency information; and
    recording a contact point in the dependency information for the node having the link that crosses the boundary.

3. The method of claim 2, further comprising:
    determining whether another link exists between the node and a subsequent node; and
    in response to a determination that the subsequent node should be included in the dependency information, recursively performing the traversing.

4. The method of claim 1, wherein
    each entity of the plurality of entities is one of
        a virtual computing component,
        a virtual storage component,
        a physical computing component, or
        a physical storage component.

5. A computer program product comprising:
    a plurality of instructions, comprising
        a first set of instructions, executable on a computer system, configured to create a property graph having a plurality of nodes representing a plurality of entities, wherein the plurality of entities correspond to core physical or hardware-based resources, wherein
            at least one entity of the plurality of entities is a core physical or hardware-based resource in a first data center infrastructure,
            at least another entity of the plurality of entities is a core physical or hardware-based resource in a second data center infrastructure,
            one or more nodes of the plurality of nodes is coupled to at least one other node of the plurality of nodes by one or more links of a plurality of links of the property graph, and
            each of the one or more links represents a relationship between the entities represented by the one or more nodes,
        a second set of instructions, executable on the computer system, configured to analyze entity information associated with the plurality of nodes, wherein
            the entity information is information regarding the entity, and the second set of instructions comprises
                a subset set of instructions, executable on the computer system, configured to determine whether at least one link for a node representing the at least one entity in the first data center infrastructure crosses a boundary between the first data center infrastructure and the second data center infrastructure, by virtue of the at least one link representing a relationship between the at least one entity in the first data center infrastructure and the at least another entity in the second data center infrastructure,
            wherein the boundary includes a boundary between the core physical or hardware-based resources in the first data center infrastructure and the core physical or hardware-based resources in the second data center infrastructure, and
        a third set of instructions, executable on the computer system, configured to, in response to a determination that the at least one link of the plurality of links crosses the boundary, storing the entity information for at least one of the at least one entity and/or the at least another entity in dependency information, wherein the third set of instructions comprises
    another subset set of instructions, executable on the computer system, configured to, record_a contact point in the dependency information representing a relationship between the at least one entity in the first data center infrastructure and the at least another entity in the second data center infrastructure, and
    the dependency information is configured to facilitate performance of an orchestration operation on one or more of the plurality of entities, and
    an orchestration operation executed on the at least one entity at the contact point results in execution of an orchestration operation on the at least another entity; and
a non-transitory computer-readable storage medium, wherein the instructions are encoded in the non-transitory computer-readable storage medium.

6. The computer program product of claim 5, wherein the instructions further comprise:
    a fourth set of instructions, executable on the computer system, configured to traverse a link of the property graph from one node to another node of the plurality of nodes of the property graph, wherein the link is one of the plurality of links.

7. A computer system comprising:
one or more processors;
a computer-readable storage medium coupled to the one or more processors; and
a plurality of instructions, encoded in the computer-readable storage medium and configured to cause the one or more processors to
    create a property graph having a plurality of nodes representing a plurality of entities, wherein the plurality of entities correspond to core physical or hardware-based resources, wherein
        at least one entity of the plurality of entities is a core physical or hardware-based resource in a first
        at least another entity of the plurality of entities is a core physical or hardware-based resource in a second data center infrastructure,
        one or more nodes of the plurality of nodes is coupled to at least one other node of the plurality of nodes by one or more links of a plurality of links of the property graph, and
        each of the one or more links represents a relationship between the entities represented by the one or more nodes,
    analyze entity information associated with the plurality of nodes, wherein
        the entity information is information regarding the entity, and the plurality of instructions configured to cause the one or more processors to analyze are configured to
        determine whether at least one link of the plurality of links for a node representing the at least one entity in a first data center infrastructure crosses a boundary between the first data center infrastructure and the second data center infrastructure, by virtue of the at least one link representing a relationship between the at least one entity in the first data center infrastructure and the at least another entity in the second data center infrastructure,
        wherein the boundary includes a boundary between the core physical or hardware-based resources in the first data center infrastructure and the core physical or hardware-based resources in the second data center infrastructure; and
    in response to a determination that the at least one link of the plurality of links crosses the boundary, store entity information for at least one of the at least one entity and/or the at least another entity in dependency information, wherein the plurality of instructions configured to cause the one or more processors to store are configured to record a contact point in the dependency information representing a relationship between the at least one entity in the first data center infrastructure and the at least another entity in the second data center infrastructure,
    the dependency information is configured to facilitate performance of an orchestration operation on one or more of the plurality of entities, and
    an orchestration operation executed on the at least one entity at the contact point results in execution of an orchestration operation on the at least another entity.

8. The computer system of claim 7, wherein the plurality of instructions is further configured to cause the one or more processors to:
    traverse the plurality of links to identify other links of the plurality of links crossing the boundary,
        determining whether a node having a link that crosses the boundary should be included in the dependency information;
        in response to a determination that the node having a link that crosses the boundary should be included in the dependency information; and
        recording a contact point in the dependency information for the node having the link that crosses the boundary.

* * * * *